United States Patent
Fernandez et al.

(10) Patent No.: US 6,445,840 B1
(45) Date of Patent: Sep. 3, 2002

(54) MICROMACHINED OPTICAL SWITCHING DEVICES

(75) Inventors: Marc Fernandez; Anis Husain; Li Fan, all of San Diego, CA (US)

(73) Assignee: OMM, Inc., San Diego, CA (US)

( * ) Notice: Subject to any disclaimer, the term of this patent is extended or adjusted under 35 U.S.C. 154(b) by 0 days.

(21) Appl. No.: 09/483,269

(22) Filed: Jan. 13, 2000

Related U.S. Application Data

(60) Provisional application No. 60/136,438, filed on May 28, 1999.

(51) Int. Cl.$^7$ ............................... G02B 6/35; G02B 6/28

(52) U.S. Cl. ............................... 385/17; 385/19; 385/24

(58) Field of Search ............................... 385/16–24, 47; 359/124, 127, 128, 627, 871–877

(56) References Cited

U.S. PATENT DOCUMENTS

| | | | |
|---|---|---|---|
| 3,430,057 A | 2/1969 | Genahr | 250/227.28 |
| 3,622,792 A | 11/1971 | Piccininni | 359/298 |
| 3,990,780 A | 11/1976 | Dakss | 385/17 |
| 4,208,094 A | 6/1980 | Tomlinson | 385/18 |
| 4,303,302 A | 12/1981 | Ramsey | 385/23 |
| 4,317,611 A | 3/1982 | Peterson | 359/214 |
| 4,580,873 A | * 4/1986 | Levinson | 385/17 |

(List continued on next page.)

FOREIGN PATENT DOCUMENTS

| | | |
|---|---|---|
| DE | 19500214 | 7/1996 |
| DE | 195 00 214 A1 * | 7/1996 |
| DE | 195 00 214 A1 | 7/1996 |
| DE | 19644918 A | 4/1998 |
| DE | 196 44 918 A1 | 4/1998 |
| EP | 0510629 | 10/1992 |

(List continued on next page.)

OTHER PUBLICATIONS

Lin et al., "High–Density Micromachined Polygon Optical Crossconnects Exploiting Network Connection–Symmetry", IEEE Photonics Technology Letters, vol. 10, No. 10, Oct. 1998, p. 1425–1427.*

Chen et al., "A High–Speed Low–Voltage Stress–Induced Micromachined 2 × 2 Optical Switch", IEEE Photonics Technology Letters, vol. 11, No. 11, Nov. 1999, pp. 1396–1398.*

(List continued on next page.)

*Primary Examiner*—Brian Healy
*Assistant Examiner*—Michelle R. Connelly-Cushwa
(74) *Attorney, Agent, or Firm*—Arien Ferrell; Cooley Godward LLP

(57) ABSTRACT

Various 3-port and 4-port micromachined optomechanical matrix switches are disclosed herein. In accordance with one aspect of the invention there is provided an optomechanical matrix switch including a substrate and a first plurality of optomechanical switching cells coupled thereto. Each of the first plurality of optomechanical switching cells is arranged to be in optical alignment with a first input port. A second plurality of optomechanical switching cells is also coupled to the substrate, each of the second plurality of optomechanical switching cells being in optical alignment with a second input port. In another aspect of the present invention an optomechanical matrix switch is provided which includes a substrate and a first plurality of optomechanical switching cells coupled thereto. Each of the first plurality of optomechanical switching cells is placed in optical alignment with one of a corresponding first plurality of input ports and with one of a corresponding first plurality of output ports. The matrix switch further includes a second plurality of optomechanical switching cells coupled to the substrate. Each of the second plurality of optomechanical switching cells is placed in optical alignment with one of a corresponding second plurality input ports and with one of a corresponding second plurality of output ports.

18 Claims, 18 Drawing Sheets

U.S. PATENT DOCUMENTS

| | | | |
|---|---|---|---|
| 4,626,066 A | 12/1986 | Levinson | 385/22 |
| 4,630,883 A | 12/1986 | Taylor et al. | 350/96.15 |
| 4,740,050 A | 4/1988 | Husain | 350/96.16 |
| 4,762,382 A | 8/1988 | Husain | 350/96.12 |
| 4,850,697 A | 7/1989 | Schoennauer | 356/419 |
| 4,932,745 A | 6/1990 | Blonder | 385/118 |
| 4,989,941 A | 2/1991 | Soref | 350/96.18 |
| 5,037,173 A | 8/1991 | Sampsell et al. | 385/17 |
| 5,042,889 A | 8/1991 | Benzoni | 385/16 |
| 5,052,777 A | 10/1991 | Ninnis et al. | 385/19 |
| 5,097,229 A | 3/1992 | Forge | 332/115 |
| 5,168,535 A | 12/1992 | Laor | 385/16 |
| 5,199,088 A | 3/1993 | Magel | 385/18 |
| 5,208,880 A | 5/1993 | Riza | 385/18 |
| 5,255,332 A | 10/1993 | Welch et al. | 385/17 |
| 5,278,515 A | 1/1994 | Mathews | 330/59 |
| 5,311,410 A | 5/1994 | Hsu et al. | 362/20 |
| 5,317,659 A | 5/1994 | Lee | 385/22 |
| 5,351,330 A | 9/1994 | Jongewaard | 385/93 |
| 5,375,033 A | 12/1994 | MacDonald | 361/281 |
| 5,410,371 A | 4/1995 | Lambert | 348/769 |
| 5,420,946 A | 5/1995 | Tsai | 385/22 |
| 5,428,218 A | 6/1995 | Toughlian et al. | 250/227 |
| 5,436,986 A | 7/1995 | Tsai | 385/16 |
| 5,444,801 A | 8/1995 | Laughlin | 385/16 |
| 5,522,796 A | 6/1996 | Dorsey, III | 604/118 |
| 5,524,153 A | 6/1996 | Laor | 385/16 |
| 5,555,327 A | 9/1996 | Laughlin | 385/16 |
| 5,572,014 A | 11/1996 | Wu et al. | 250/208.2 |
| 5,581,643 A | 12/1996 | Chi Wu | 385/17 |
| 5,621,829 A | 4/1997 | Ford | 385/22 |
| 5,646,928 A | 7/1997 | Wu et al. | 369/112 |
| 5,651,023 A | 7/1997 | MacKinnon | 372/107 |
| 5,774,604 A | 6/1998 | McDonald | 385/18 |
| 5,786,925 A | 7/1998 | Goossen et al. | 359/245 |
| 5,835,212 A | 11/1998 | Kissa et al. | 356/345 |
| 5,841,917 A * | 11/1998 | Jungerman et al. | 385/17 |
| 5,867,297 A | 2/1999 | Kiang et al. | 359/198 |
| 5,878,177 A | 3/1999 | Karasan et al. | 385/17 |
| 5,903,687 A * | 5/1999 | Young et al. | 385/17 |
| 5,923,798 A | 7/1999 | Aksyuk et al. | 385/19 |
| 5,933,269 A | 8/1999 | Robinson | 359/260 |
| 5,943,454 A | 8/1999 | Aksyuk et al. | 385/22 |
| 5,945,898 A | 8/1999 | Judy | 335/78 |
| 5,960,131 A * | 9/1999 | Fouquet et al. | 385/17 |
| 5,960,132 A * | 9/1999 | Lin | 385/18 |
| 5,995,688 A * | 11/1999 | Aksyuk et al. | 385/14 |
| 6,031,946 A | 2/2000 | Bergmann | 385/18 |
| 6,031,947 A | 2/2000 | Laor | 385/22 |
| 6,108,466 A | 8/2000 | Aksyuk | 385/19 |
| 6,125,218 A | 9/2000 | Humphrey | 385/19 |
| 6,137,103 A | 10/2000 | Giles | 250/216 |
| 6,137,105 A | 10/2000 | Drobot | 250/234 |
| 6,137,926 A | 10/2000 | Maynard | 385/18 |
| 6,144,781 A * | 11/2000 | Goldstein et al. | 385/18 |
| 6,154,585 A | 11/2000 | Copner | 385/16 |
| 6,154,586 A | 11/2000 | MacDonald | 385/18 |
| 6,157,026 A | 12/2000 | Redmer | 250/229 |
| 6,160,928 A | 12/2000 | Schroeder | 385/18 |
| 6,169,827 B1 | 1/2001 | Holman | 385/22 |
| 6,173,105 B1 | 1/2001 | Aksyuk | 385/140 |
| 6,195,478 B1 | 2/2001 | Fouquet | 385/17 |
| 6,205,267 B1 | 3/2001 | Aksyuk | 385/19 |
| 6,208,777 B1 | 3/2001 | Jing | 385/16 |
| 6,215,222 B1 | 4/2001 | Hoen | 310/309 |
| 6,215,919 B1 | 4/2001 | Li | 385/16 |
| 6,215,921 B1 | 4/2001 | Lin | 385/18 |
| 6,218,762 B1 | 4/2001 | Hill | 310/307 |
| 6,219,472 B1 | 4/2001 | Horino | 385/16 |
| 6,229,640 B1 | 5/2001 | Zhang | 359/290 |
| 6,236,491 B1 | 5/2001 | Goodwin-Johansson | 359/291 |
| 6,243,507 B1 | 6/2001 | Goldstein | 385/13 |
| 6,246,504 B1 | 6/2001 | Hagelin | 359/212 |

FOREIGN PATENT DOCUMENTS

| | | | |
|---|---|---|---|
| EP | 0510 629 A1 | 10/1992 | G02B/26/02 |
| EP | 0 550 017 A2 | 12/1992 | |
| EP | 0550017 A | 7/1993 | |
| EP | 0 880 040 A2 | 11/1998 | G02B/6/26 |
| EP | 0902538 | 3/1999 | |
| EP | 0 902 538 A2 | 3/1999 | H03K/17/968 |
| EP | 0 903 607 A2 | 3/1999 | G02B/26/08 |
| EP | 0 921 702 A2 | 6/1999 | H04Q/11/00 |
| EP | 1033601 | 9/2000 | |
| EP | 1061389 | 12/2000 | |
| EP | 1067421 | 1/2001 | |
| EP | 1076254 | 2/2001 | |
| EP | 1089108 | 4/2001 | |
| EP | 1099966 | 5/2001 | |
| EP | 1099971 | 5/2001 | |
| EP | 1102104 | 5/2001 | |
| EP | 1103835 | 5/2001 | |
| EP | 1104746 | 6/2001 | |
| JP | 01238605 | 9/1989 | G02B/26/02 |
| WO | WO 98/09289 | 3/1998 | G11B/11/10 |
| WO | WO98/09289 A | 3/1998 | |
| WO | WO 99/63374 | 12/1999 | |
| WO | WO 00/25161 | 5/2000 | |
| WO | WO 00/67063 | 11/2000 | |
| WO | WO 00/68719 | 11/2000 | |
| WO | WO 00/75711 | 12/2000 | |
| WO | WO 00/77556 | 12/2000 | |
| WO | WO 00/79311 | 12/2000 | |
| WO | WO 01/03152 | 1/2001 | |
| WO | WO 01/06543 | 1/2001 | |
| WO | WO 01/09653 | 2/2001 | |
| WO | WO 01/11411 | 2/2001 | |
| WO | WO 01/13151 | 2/2001 | |
| WO | WO 01/19723 | 3/2001 | |
| WO | WO 01/27668 | 4/2001 | |
| WO | WO 01/28258 | 4/2001 | |
| WO | WO 01/38921 | 5/2001 | |

OTHER PUBLICATIONS

Marxer et al., "Vertical Mirrors Fabricated By Reactive Ion Etching For Fiber Optical Switching Applications", MEMS '97 Proceedings, IEEE., Jan. 26–30, 1997, pp. 49–54.*

Miller et al., "An Electromagnetic MEMS 2×2 Fiber Optic Bypass Switch", Transducers '97, IEEE., Jun. 16–19, 1997, pp. 89–92.*

Mita et al., "An Out–of–Plane Polysilicon Actuator with a Smooth Vertical Mirror for Optical Fiber Switch Application", 1998 IEEE/LEOS Summer Topical Meetings, Jul. 20–24, 1998, pp. II/33–II/34.*

"A Four Input Tera Switch Module and its Symbolic Representation," http://www.ece.ucsb.edu/MOST/10.html (Jul. 13, 1999).

"An Outline of a Tera Swtich," http://www.ece.ucsb.edu/MOST/11.html (Jul. 13, 1999).

Akimoto, et al., "Evaluation of Comb–Drive Nickel Micromirror For Fiber Optical Communication," IEEE, pp. 68–71.

Akimoto, et al., "Optical Reflective Filter with Comb–Drive Nickel Micromirror for Optical Fiber Communication," IEEE, pp. 614–619, (1997).

Bishop, David, "Mini–machines may make it possible to have tiny airborne monitors," http://www.nytimes.com/library/tech/99/09/circuits/articles/23net.html, (1999).

Bishop, et al., "Optical Micromachined Devices Serve Multiple Applications," Semiconductor online,sysiwyg://53/ http://news.semiconduc../feature–articles/19980 127–91.html, (Jul. 13, 1999).

Chu, et al., "Dynamics of polysilicon parallel–plate electrostatic actuators," Elsevier Science S.A., pp. 216–220, (1996).

Dangel, et al., "Electro–Nanomechanically Activated Integrated–Optical Interferometric Switches," JFA, pp. 6–1 through 6–4.

"Evolution or Revolution," http://www.opticalswitch.com/patents.htm (Jul. 13, 1999).

Fujita, et al., "Application of micromachining technology to optical devices and systems," SPIE, 2882:2–11.

Fujita, Hiroyuki, "Future of actuators and microsystems," Elesevier Science S.A., pp. 105–111, (1996).

Fujita, et al., "Micromachined Optical Switches for Free–Space Beam Steering," IEEE, pp. 19–20, (1998).

Fujita, Hiroyuki, "Recent Progress in Micromaching and Applications to Microactuators," Jpn. J. Appl. Phys. 33(12B)Part 1:7163–7166, (1994).

Fujita, Hiroyuki, "Application of micromachining technology to optical devices and systems," SPIE 2879:2–11.

Hashimoto, et al., "Micro–optical gate for fiber optic communication," IEEE, pp. 331–334, (1997).

Himeno, et al., "Recent progress on silica–based optical switches and free–space optical switches," SPIE 2691:72–83.

"Integrated Optics and Microstructures," SPIE 1793:114–126, (1992).

Jalali, Bahram, "Microwave Photonics Research at UCLA," http://engine.ieee.org/pubs/newsletters/leos/aug96/htmlfile, (Aug. 27, 1997).

Kawai, Shigeru, "Free–Space Optical Crossbar–Switches for Self–Routing and Strictly Nonblocking Networks," Optical Review 4(3)390–394, (1997).

Kawai, et al., "Free–Space Optical Switches with Strictly Nonblocking and Self–Routing Functions," NEC Res. & Develop. 37(4):455–466, (Oct. 1996).

Konishi, et al., "System Design for Cooperation Control of Arrayed Micractuators," IEEE, pp. 322–327, (1995).

Konishi, et al., "System Design for Cooperative Control of a Microactuator Array," IEEE, 42(5):449–454, (Oct. 1995).

Lee, et al., "Realization of Free–Space Fiber Optic Switches Using The Surface–Micromachining Technology," pp. 71–72.

Lee, et al., "Surface–micromachined free–space fibre–optic switches," Electronics Letters, 31(17):1481–1482, (Aug. 1995).

Levitan, et al., "Computer Aided Design and Simulation of Free Space Optoelectronic Information Processing Systems," http://kona.ee.pitt.edu:80/steve/CAD_FS–OIPS.html.

Magel, et al., "Phosphosilicate glass waveguides for phased–array radar time delay," SPIE 1703:373–378, (1992).

"Micromachined Optical Switches," author unknown, publication unknown, facsimile dated Sep. 1997.

"Micromechanic Shutter Fiber–Optic Switch," IBM Technical Bulletin, 37(02B), (Feb. 1994).

Miller, et al., "Electromagnetic MEMS Scanning Mirrors for Holographic Data Storage," pp. 183–186, (1996).

Miller, et al., "An Electromagnetic MEMS 2 × 2 Fiber Optic Bypass Switch," IEEE, pp. 89–92, (1997).

Miller, et al., "A magnetically actuated MEMS scanning mirror," SPIE 2687:47–52, (1996).

Mita, et al., "An Out–of–Plane Polysilicon Actuator with a Smooth Vertical Mirror for Optical Fiber Switch Application," IEEE, pp. 33–34, (1998).

Nagaoka, et al., "Compact Optomechanical Switches and Their Applications in Optical Communication and Testing Systems," pp. 366–371.

Nagaoka, et al., "Fabrication of Micro–Pipes and Their Applications to Single–Mode Fiber Switching and Splicing," IEICE Trans. Electron, E80–C(2):280–284, (1997).

Nagaoka, et al., "Micro–Mechanical Single–Mode Fiber Switches and Their Applications," pp. 252–255.

Nagaoka, et al., "Compact Latching Type Single–Mode Fiber Switches and Their Applications in Subscriber Loop Networks," IEICE Trans. Electron, E80–C(1):149–153, (1997).

Nelson, W.H., "Progress on Ditital Optical Switches and Switch Arrays," OFC '95 Technical Digest, pp. 280–281, (1995).

Owen, et al., "Design of Mirror Structures for Two Dimensional Integrated Optical Crosspoint Switches," p. 119.

Pepe, Joe, "Photonic Switching and Multiplexing," http://www.eecis.udel.edu/—pepe/photon.html#The Optical Switch, (Jul. 1999).

Pister, et al., "Microfabricated hinges," Sensors and Actuators A. 33:249–256, (1992).

Riza, Nabeel A., "Micromechanical fiber–optic switches for optical networks," SPIE 1793:108–113, v (1992).

Shaffer, Richard, "The Next Big Switch Will Be Optical," http://www.pathfinder.com/fortune/digitalwatch/0622tec5.html, (Mar. 17, 1999).

"Switching Element for Lossless, Low Crosstalk Optical Crossbar," http://www.ece.ucsb.edu/MOST/17html. (Jul. 13, 1999).

"The Center for Multidisciplinary Optical Switching Technology," http://www.ece.ucsb.edu/MOST/html (Jul. 13, 1999).

"The Tera Switch," http://www.ece.ucsb.edu/MOST/9.html (Jul. 13, 1999).

Toshiyoshi, et al., "An Electrostatically Operated Torsion Mirror For Optical Switching Device," Transducers Eurosensors IX:297–300, (1995).

Toshiyoshi, et al., "Electrostatic Micro Torsion Mirrors for an Optical Switch Matrix," J. of Microelectromechanical Systems, 5(4):231–237, (Dec. 1996).

Toshiyoshi, et al., "Fabrication and Operation of Electrostatic Micro Torsion Mirrors for Optical Switches," Technical Digest of the $14^{th}$ Sensor Symposium, pp. 275–278, (1996).

Toshiyoshi, et al., "Microactuators Based on Newly Developed Pseudostatic Displacement Mechanism," Proceedings of the ASME Dynamic Systems and Control Division, 57(2):989–994, (1995).

Toshiyoshi, et al., "Micromachined polysilicon torsion mirrors for an electrostatic optical switch in a free space," SPIE 3321:556–561.

Toshiyoshi, et al., "Optical Crossconnection by Silicon Micromachined Torsion Mirrors," pp. 63–64, (date unknown).

Ullrich, Rita T., "ATT News Release," http://www.att.com/press/0190/900107.bia.html, (1997).

Van Rijn, et al., "High Flow Rate Microsieve for Bio Medical Applications," Proceedings of the ASME Dynamic Systems and Control Division, 57(2):995, (1995).

Wu, et al., "Integrated devices make an optical bench on a chip," Laser Focus World, pp. 64–68, (1996).

Wu, et al., "Electrical and Optical Engineering MEMS for Optical Applications," http://www.unex.ucla.edu/develop/rick/fall96–2/MEMS.html, (Aug. 27, 1997).

Lin et al., "High–Density Micromachined Polygon Optical Crossconnects Exploiting Network Connection–Symmetry," *IEEE Photonics Technology Letters*: (10)10:1425–1427, (1998).

Collins, D. R. et al., "Deformable Mirror Device Spatial Light Modulators And Their Applicability To Optical Neural Networks," Applied Optics, US, Optical Society Of America, Washington, vol. 28, No. 22, Nov. 15, 1989, pp. 4900–4907.

Lin, L.Y., "Micromachined Integrated Optics for Free–Space Interconnections," Proceedings IEEE Micro Electro Mechanical Systems.

Marxer, C., "Vertical Mirrors Fabricated By Reactive Ion Etching For Fiber Optical Switching Applications," IEEE, Institute of Microtechnology, Univ. of Neuchatel, p. 49–53.

Muller, Richards S., "Surface–Micromachined Microoptical Elements and Systems," Proceedings of the IEEE, vol. 86 ( No. 8), p. 1705–1720.

Lin, L.Y., "High–Density Micromachined Polygon Optical Crossconnects Exploiting Network Connection–Symmetry," IEEE Photonics Technology Letters, vol. 10 ( No. 10).

* cited by examiner

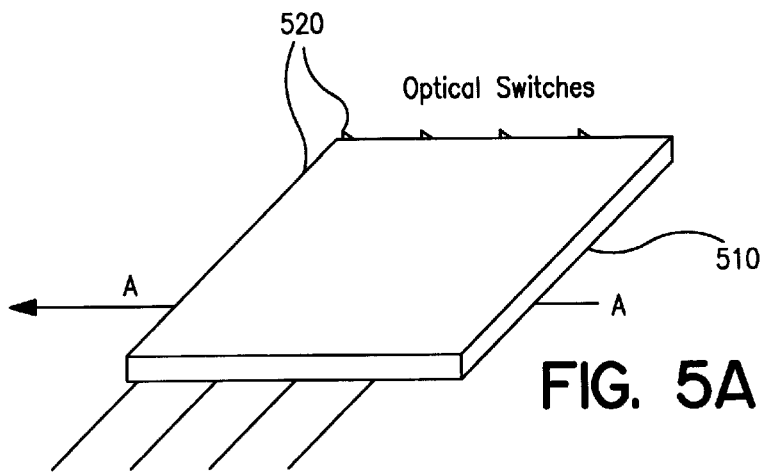
FIG. 5A
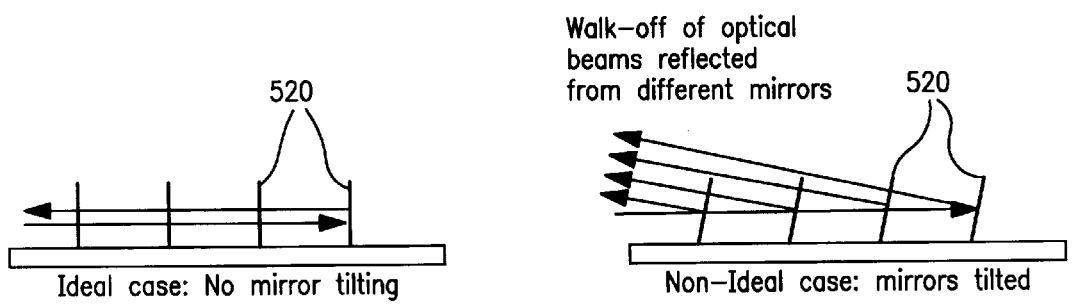
FIG. 5B  
FIG. 5C
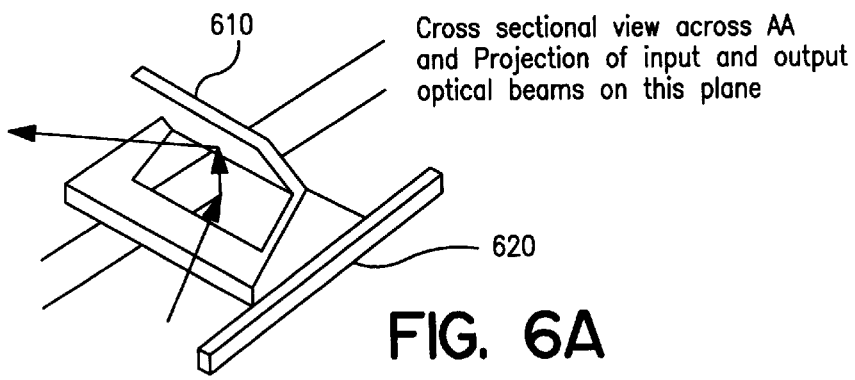
FIG. 6A
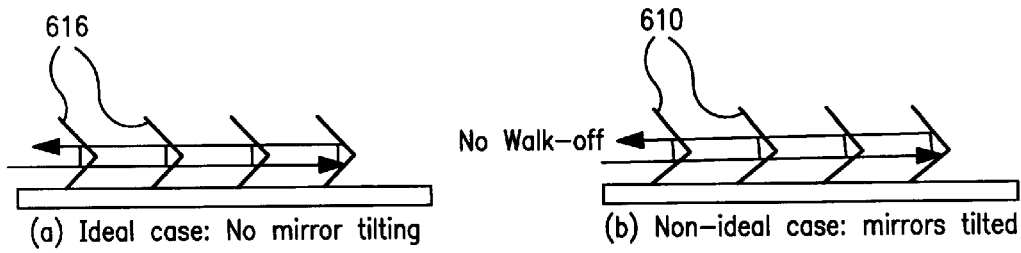
FIG. 6B  
FIG. 6C Optical Switches with on-Chip
Hermetic Sealing

MICROMACHINED OPTICAL SWITCHING DEVICES

CROSS-REFERENCE TO RELATED APPLICATIONS

This application claims priority to U.S. provisional application No. 60/136,438, entitled, "ASSEMBLY AND PACKAGING OF MICROMACHINED OPTICAL SWITCHES", filed on May 28, 1999, and which is incorporated herein in its entirety including any drawings.

BACKGROUND OF THE INVENTION

1. Field of the Invention

The invention relates generally to the field of optical switching. More particularly, the invention relates to the design, fabrication, assembly and packaging of micro electro mechanical systems (MEMS) technology optomechanical switching cells, and N×M matrix switches composed thereof.

2. Discussion of the Related Art

Optical switching plays a very important role in telecommunication networks, optical instrumentation, and optical signal processing systems. In telecommunication networks, fiber optic switches are used for network restoration, reconfiguration, and dynamic bandwidth allocation.

There are many different types of optical switches. In terms of the switching mechanism, optical switches can be divided into two general categories.

The first general category of optical switches employs a change of refractive index to perform optical switching. This first general category can be termed "electrooptic switches." Actually, the refractive index change can be induced by electro-optic, thermal-optic, acousto-optic, or free-carrier effects. In the last of these examples, free carriers are generated by an electric charge introduced into a device, thereby causing a change in the material's dipoles, which in turn changes the material's index of refraction. Heretofore, the general category of electro-optic switches was generally employed in the case of coupled optical waveguides.

The second general category of optical switches employs physical motion of one, or more, optical elements to perform optical switching. In this way, a spatial displacement of a reflected beam is affected. This second general category can be termed "optomechanical switches."

Optomechanical switches offer many advantages over electro-optic switches. Optomechanical switches have both lower insertion loss and lower crosstalk compared to electro-optic switches. Further, optomechanical switches have a high isolation between their ON and OFF states. Furthermore, optomechanical switches are bidirectional, and are independent of optical wavelength, polarization, and data modulation format. An optomechanical switch can be implemented either in a free-space approach or in a waveguide (e.g., optical fiber) approach. The free-space approach is more scalable, and offers lower coupling loss compared to the waveguide approach.

Macro-scale optomechanical switches employing external actuators are currently available. For example, conventional optomechanical switches are available from JDS, DiCon, AMP, and Hewlett Packard. However, one problem with this macro-scale optomechanical switch technology is that macro-scale optomechanical switches are bulky. Another problem with this technology is that macro-scale optomechanical switches require extensive manual assembly. Another problem with this technology is that the switching speed of macro-scale optomechanical switches is slow. For instance, the switching times for the currently commercially available optomechanical switches range from 10 milliseconds to several hundred milliseconds. An even more serious problem is that their switching times often depends on their specific switching path (i.e., how far is the distance from the next output port from the current output port). This variation of switching time as a function of spatial displacement is highly undesirable from a systems integration point of view. Therefore, what is needed is a solution that requires less bulk and less manual assembly, while simultaneously providing faster and more consistent switching speed.

Meanwhile, a number of different micromachining technologies have been developing. Micromachining offers many advantages for building optomechanical switches.

Micro electro mechanical systems (MEMS) technology is a micromachining technique that uses a batch processing technique. Micro electro mechanical systems technology is similar to semiconductor electronics fabrication except that the resulting devices possess mechanical functionality, as well as electronic and/or optical functionality.

Micro electro mechanical systems technology is currently used to fabricate movable microstructures and microactuators. The use of micro electro mechanical systems technology to fabricate optomechanical switches can significantly reduce the size, weight, and cost of the resulting optomechanical switches.

Micro electro mechanical systems technology includes bulk-micromachining and surface-micromachining techniques. Both bulk-micromachining and surface-micromachining have been applied to fabricate fiber optic switches.

Many optomechanical switches employ movable micromirrors. Although there are many possible configurations for the micromirrors, vertical micromirrors (i.e., the mirror surface is perpendicular to the substrate) offer many advantages from the architecture and packaging point of view. Using vertical micromirrors, a simple matrix switch with a regular two-dimensional array of switching cells can be realized. In more detail, the input and output fibers can be arranged in the same plane as the matrix substrate. Further, packaging is greatly simplified in this configuration.

Most of the vertical micromirrors reported in the literature have been fabricated by one of five methods. The first method is anisotropic chemical etching of (110) silicon wafer (using, e.g., KOH solution). The second method is deep reactive ion etching (DRIE). The third method is electroplating or the LIGA process. The fourth method is flip-up micromirrors with surface-micromachined microhinges. The fifth method is torsion mirrors.

Referring to the first method, anisotropic etching of (110) silicon substrate can produce an atomically smooth micromirror surface. However, a problem with the anisotropic etching method is that monolithic integration of the micromirrors with the microactuators is difficult. In an attempt to address this problem, external bulk actuators have been used. In another approach to addressing this problem, the micromirror substrate is simply glued to a micro flap actuator. However, this is not a manufacturable process. Therefore, what is also needed is a solution that facilitates integration of the micromirrors with the microactuators while simultaneously yielding a manufacturable process.

Referring to the second method, direct reactive ion etching can produce vertical micromirrors with straight sidewalls (with an aspect ratio of approximately 50:1). However, a problem with the direct reactive ion etching method is that the surface of the etched sidewalls tend to be rough. The Bosch DRIE process produces a periodic corrugation on the sidewalls due to alternating etching/coating process. The actuators of DRIE mirrors are usually limited to comb drive actuators, which have a limited travel distance. Therefore, what is also needed is a solution that provides a smooth mirror surface while simultaneously providing a large travel distance.

Referring to the third method, a problem with electroplated micromirrors is that they often may not have straight or vertical sidewalls. The LIGA process can produce high quality micromirrors, however, it requires expensive X-ray lithography. Further, integration with the actuators is a difficult issue for LIGA micromirrors. Therefore, what is also needed is a solution that provides an economical straight mirror surface while simultaneously facilitating the integration of the micromirrors with the microactuators.

Referring to both the fourth and fifth methods, the microhinged mirrors and torsion micromirrors are usually made of polysilicon plates. However, chemical-mechanical polishing (CMP) or other process is usually required to smooth the resulting mirror surface. This reduces the efficiency of the manufacturing process by significantly increasing the number of process steps. In addition, control of the mirror angle to within 0.5° as required by large matrix switches is difficult to achieve with microhinged mirrors and torsion micromirrors. Therefore, what is also needed is a solution that provides manufacturing efficiency while simultaneously providing the required control of the mirror angle.

Heretofore, the requirements of less bulk, less manual assembly, faster and more consistent switching speed, integration with actuators, smoothness and straightness of the mirror surface, sufficient mirror travel distance, economy, manufacturing efficiency, and control of the mirror angle referred to above have not been fully met. What is needed is a solution that simultaneously addresses all of these requirements.

SUMMARY OF THE INVENTION

A primary object of the invention is to provide an approach to integrating optomechanical switching cell micromirrors and microactuators that can be implemented on an optomechanical switching matrix scale, or even on a wafer scale. Another primary object of the invention is to provide an approach to self-assembling optomechanical switching cell micromirrors and/or microactuators. Another primary object of the invention is to provide an approach to making optimechanical switching cell micromirrors tilt-insensitive. Another primary object of the invention is to provide a microactuated optomechanical switching cell. Another primary object of the invention is to provide an optomechanical matrix switch architecture for uniform fiber coupling loss. Another primary object of the invention is to provide input/output power monitoring for an optomechanical matrix switch. Another primary object of the invention is to provide an optomechanical matrix switch with integrated microlenses. Another primary object of the invention is to provide an optomechanical matrix switch with integrated wavelength division multiplexers and/or demultiplexers. Another primary object of the invention is to provide on-chip hermetic sealing for an optomechanical matrix switch. Another primary object of the invention is to provide an approach to aligning optomechanical matrix switches with optical fiber ribbons.

In accordance with these objects, there is a particular need for the invention. Thus, it is rendered possible to simultaneously satisfy the above-discussed requirements of less bulk, less manual assembly, faster and more consistent switching speed, integration with actuators, smoothness and straightness of the mirror surface, sufficient mirror travel distance, economy, manufacturing efficiency, and control of the mirror angle, which, in the case of the prior art, are mutual contradicting and cannot be simultaneously satisfied.

A first aspect of the invention is implemented in an embodiment that is based on a method of making an optomechanical matrix switch, comprising: joining a plurality of mirrors on a carrier to said plurality of actuators on a substrate; and removing said carrier from said plurality of mirrors so as to form a plurality of optomechanical switching cells on said substrate. A second aspect of the invention is implemented in an embodiment that is based on a method of making an optomechanical matrix switch, comprising: positioning a plurality of mirrors adjacent a plurality of actuators on a substrate; joining said plurality of mirrors to said plurality of actuators so as to form a plurality of optomechanical switching cells. A third aspect of the invention is implemented in an embodiment that is based on an optomechanical switching cell, comprising a tilt-insensitive mirror. A fourth aspect of the invention is implemented in an embodiment that is based on an optomechanical switching cell, comprising: an actuator positioned on a substrate; and a mirror coupled to said actuator. A fifth aspect of the invention is implemented in an embodiment that is based on an optomechanical matrix switch, comprising: a substrate; a plurality of optomechanical switching cells coupled to said substrate, each of said plurality of optomechanical switching cells coupled to said substrate, each of such plurality of optomechanical switching cells including a mirror and an actuator; and a switch architecture for uniform fiber coupling loss. A sixth aspect of the invention is implemented in an embodiment that is based on an optomechanical matrix switch, comprising: a substrate; a plurality of optomechanical switching cells coupled to said substrate, each of said plurality of optomechanical switching cells including a mirror and an actuator; and a means for input/output power monitoring. A seventh aspect of the invention is implemented in an embodiment that is based on an optomechanical matrix switch, comprising: a substrate; a plurality of optomechanical switching cells coupled to said substrate, each of said plurality of optomechanical switching cells including a mirror and an actuator; and a plurality of integrated microlenses coupled to said substrate. An eighth aspect of the invention is implemented in an embodiment that is based on an optomechanical matrix switch, comprising: a substrate; a plurality of optomechanical switching cells connected to said substrate, each of said plurality of optomechanical switching cells including a mirror and an actuator; and a plurality of integrated wavelength division devices coupled to said substrate. A ninth aspect of the invention is implemented in an embodiment that is based on an optomechanical matrix switch, comprising: a substrate; a plurality of optomechanical switching cells coupled to said substrate, each of said optomechanical switching cells including a mirror and an actuator; and a hermetic seal coupled to said substrate, said hermetic seal providing a substantially gas tight isolation of said plurality of optomechanical switching cells. A tenth aspect of the invention is implemented in an embodiment that is based on a method of aligning an optomechanical matrix switch with an optical waveguide, comprising: providing an optomechanical matrix switch on a positioning stage; providing an optical waveguide on a substrate; and positioning said optomechanical matrix switch by moving said positioning stage relative to said substrate.

These, and other, objects and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters designate the same parts. It should be noted that the features illustrated in the drawings are not necessarily drawn to scale.

FIGS. 5A–5C illustrate schematic views of a matrix of flat mirrors, representing an embodiment of the invention.

FIGS. 6A–6C illustrate schematic views of a matrix of two-dimensional (2D) retro-reflectors, representing an embodiment of the invention.

DESCRIPTION OF PREFERRED EMBODIMENTS

Figures 1A, 1B:
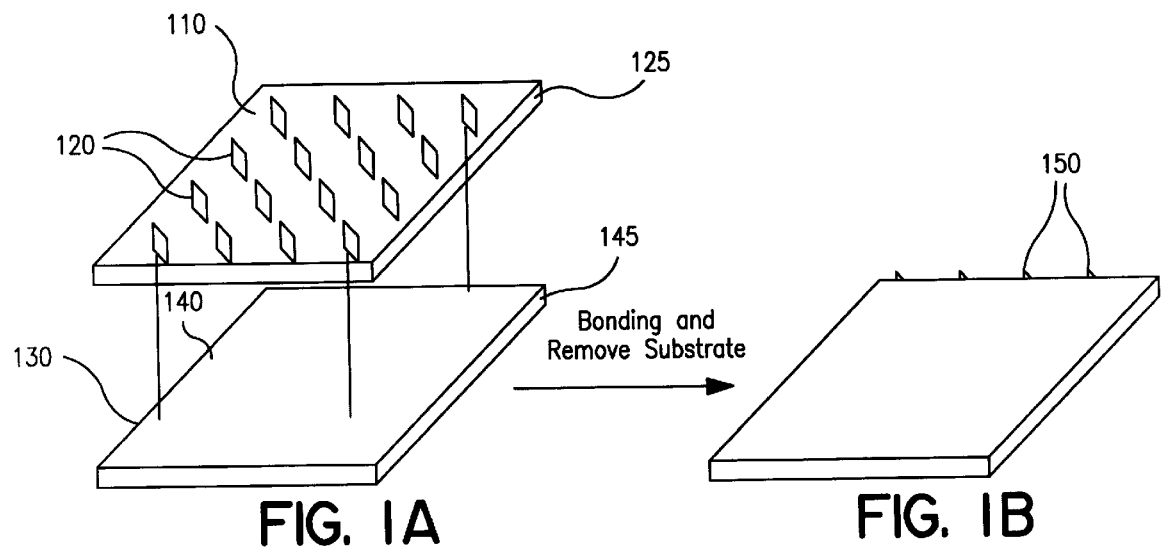
FIGS. 1A–1B illustrate schematic perspective views of a wafer scale assembly method, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail.

The below-referenced U.S. Patent Application discloses micromachined optomechanical switches. The entire contents of U.S. Ser. No. 09/093,644 are hereby expressly incorporated by reference into the present application as if fully set forth herein.

The context of the invention is communication systems, and/or computing systems, and/or any other systems where optical switching can be implemented. The invention can also utilize data processing methods that transform the optical signals so as to actuate interconnected discrete hardware elements, such as, for example, one or more of the optomechanical switching cells and/or one or more of the optomechanical matrix switches and/or one or more of the positioning stages.

Referring to the drawings, a detailed description of preferred embodiments of the invention is provided with respect to FIGS. 1A through 17. The most critical parameters for the micro electro mechanical systems optomechanical switching cells and matrix switches are the smoothness and reflectivity of the micromirrors; the angular variation of the micromirrors when they direct the input beams to the output ports (e.g., fibers); and the actuation mechanism. The quality and angular variation of the micromirror depends on the fabrication technique for the micromirror and how it is integrated with the actuator.

A. Wafer-Scale Mirror Attachment

The invention includes a wafer-scale, batch processing technique for fabricating high-quality mirrors for micro electro mechanical systems optical switches. This aspect of the invention is based on fabricating the micromirrors and the actuators separately on two different wafers, and then bonding the two wafers together with each individual micromirror bonded to an individual microactuator.

Referring to FIGS. 1A–1B, a micromirror wafer 110 includes a plurality of micromirrors 120 positioned on a substrate 125. An actuator wafer 130 includes a plurality of actuators 140 positioned on a carrier 145. The actuator wafer 130 and the plurality of actuators can be fabricated using MEMS technology. The micromirror wafer 110 is depicted being lowered toward the actuator wafer 130 in FIG. 1A, but the two wafers can be brought together in any orientation.

After the two wafers are brought together, the plurality of micromirrors 120 are joined to the plurality of actuators 140. The substrate of the micromirror wafer 110 (which can be termed a carrier) is then removed from the micromirrors. This leaves a plurality of optomechanical switching cells 150 arranged on the substrate.

This approach, particularly when implemented at a wafer scale, has at least two important advantages. First, the micromirrors and the actuators are independently optimized. High quality micromirrors and efficient actuators are thereby achieved simultaneously in a single matrix switch. Second, more accurate control of the micromirror angles is achieved. The variation in the angle of the micromirrors is determined by the ratio of the thickness variation of the bonding layer to the maximum dimension of the wafer normal to the micromirror. For example, with bonded mirrors, the variation of the bonding layer (glue) thickness across the mirror (or wafer for batch process) will cause the mirrors to tilt to various degrees. In the batch process, the mirrors are put on all at once. In the alternative (when they are put on one by one), the tolerance of alignment is determined by the size of the mirrors. When the mirrors are attached on a wafer scale, the tolerance is determined by the wafer size and not the micro-mirror. When the mirrors are bonded one at a time, it usually results in a large variation of mirror angles. Using the wafer-scale bonding, the baseline is extended to the entire wafer. For example, the angular variation is reduced to 0.003° when micromirrors on 4-inch wafers are bonded directly, assuming the bonding layer thickness variation is 10 um. This is to be compared to the angular variation of 3° when a single mirror with 100-um-wide base is bonded to the actuator.

The micromirrors can be fabricated by anisotropic etching of (110) silicon wafer using KOH, or by other wet or dry etching techniques. The micromirrors can also be fabricated on non-silicon wafers such as quartz. In more detail, the micromirrors can be dry-etched on quartz wafer.

The micro electro mechanical systems chips will need to be handled with extreme care, particularly at the dicing stage. The micro electro mechanical systems devices cannot be released before dicing, thus releasing cannot be done as a wafer-scale processing step. This means that after fabrication, the actuators and moveable structures are held rigid by the dielectric materials deposited in between the structural layers (polysilicon). After the micro electro mechanical systems chips are diced, the dielectric layers are selectively removed (this process is called releasing). Then the structures are free to move or be assembled into 3D structures.

Without limiting the invention, the actuator can take the form of electrostatic torsion plates. Examples of other actuators include thermal actuators, bimorph actuators, electromagnetic actuators, torsion plate actuators with permalloy, and actuators based on stress-induced bending and/or electrostatic force.

A biomorph actuator can be a beam composed of a sandwich of two dissimilar materials. The two beams have different thermal expansion coefficient for a thermal biomorph. By putting a voltage or heat on this combination the two metals behave differently and cause the beam to bend. Therefore, a temperature rise will cause the beam to bend. Alternatively, the beams may consist of piezoelectric materials with opposite orientation so that one beam contracts while the other extends when a voltage is applied.

A thermal actuator is similar to a thermal bimorph, but instead of two layers being attached to each other, two beams are attached to each other. Again, a different thermal expansion coefficient will cause the beams to buckle. The heat can be provided by passing a current through beams that are conductive and generate heat as resistive heaters.

In general, any microactuator having a displacement greater than the outgoing beam diameter can be used. The optical beam is usually expanded and collimated, and the beam diameters are typically on the order of approximately 100 um to approximately 1000 um.

The micromirror wafer and the actuator wafer can be bonded together by known bonding techniques: including fusion bonding, eutectic bonding, anodic bonding, and epoxy bonding. Anodic bonding is carried out between glass and doped silicon materials at elevated temperature with high voltage. Fusion bonding is a thermo-compression bonding process, where the treated mating surfaces are brought in contact at elevated temperature and pressure. Eutectic bonding is bonding formed between two mating surface in presence of an eutectic interface material. The interface material is heated to a temperature above eutectic melting point of that interface material. For example, AuSn on one surface and Au on the other surface will be used for eutectic bonding at 370 degrees C. Epoxy bonding: Epoxy is essentially like a glue. Ultraviolet (UV) sensitive epoxy can be used and can be cured by exposing the epoxy to UV light. Different types of bonding processes have different reaction temperatures and different requirements on the interface (Si, glass, or metal coated).

B. Self-Assembled Micromirror Blocks

Figures 2A, 2B:
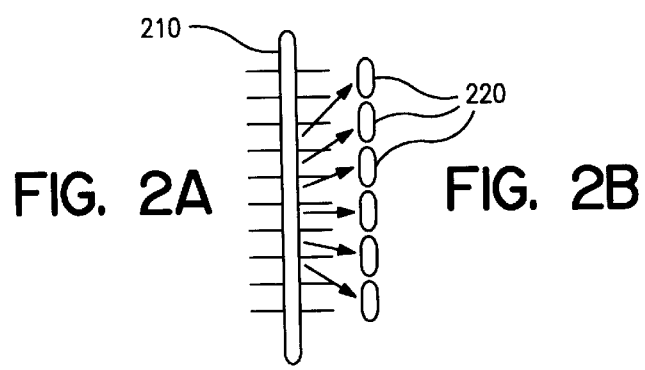
FIGS. 2A–2B illustrate schematic perspective views of a mirror fabrication method, representing an embodiment of the invention.

The invention includes a optomechanical matrix switch based on self-assembled mirror blocks. Referring to FIG. 2, a low-cost method for fabricating high quality micromirrors is depicted. Instead of wafer-scale fabrication, the micromirrors can be obtained by dicing a section of square quartz rod 210. The section of square quartz rod 210 can be fabricated at very low cost. It is separated into a plurality of individual mirror blocks 220 by dicing or cleaving the quartz rod. The section of square quartz rod can be coated with gold before dicing to increase mirror reflectivity.

Figures 3A, 3B:
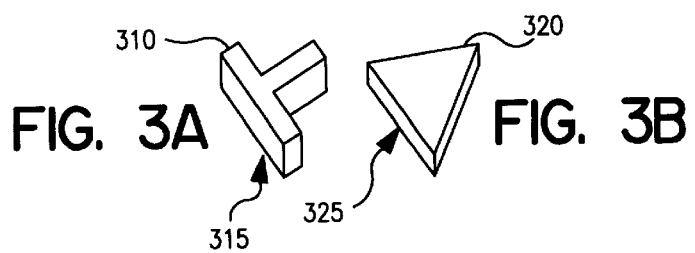
FIGS. 3A–3B illustrate schematic perspective views of two different types of mirrors, representing embodiments of the invention.

Referring to FIG. 3, the shape and length of sections 310 and 320 that are diced from the rod can be made assymetric so that only a gold-coated side 315 and 320 will face the optical beams.

Figure 4:
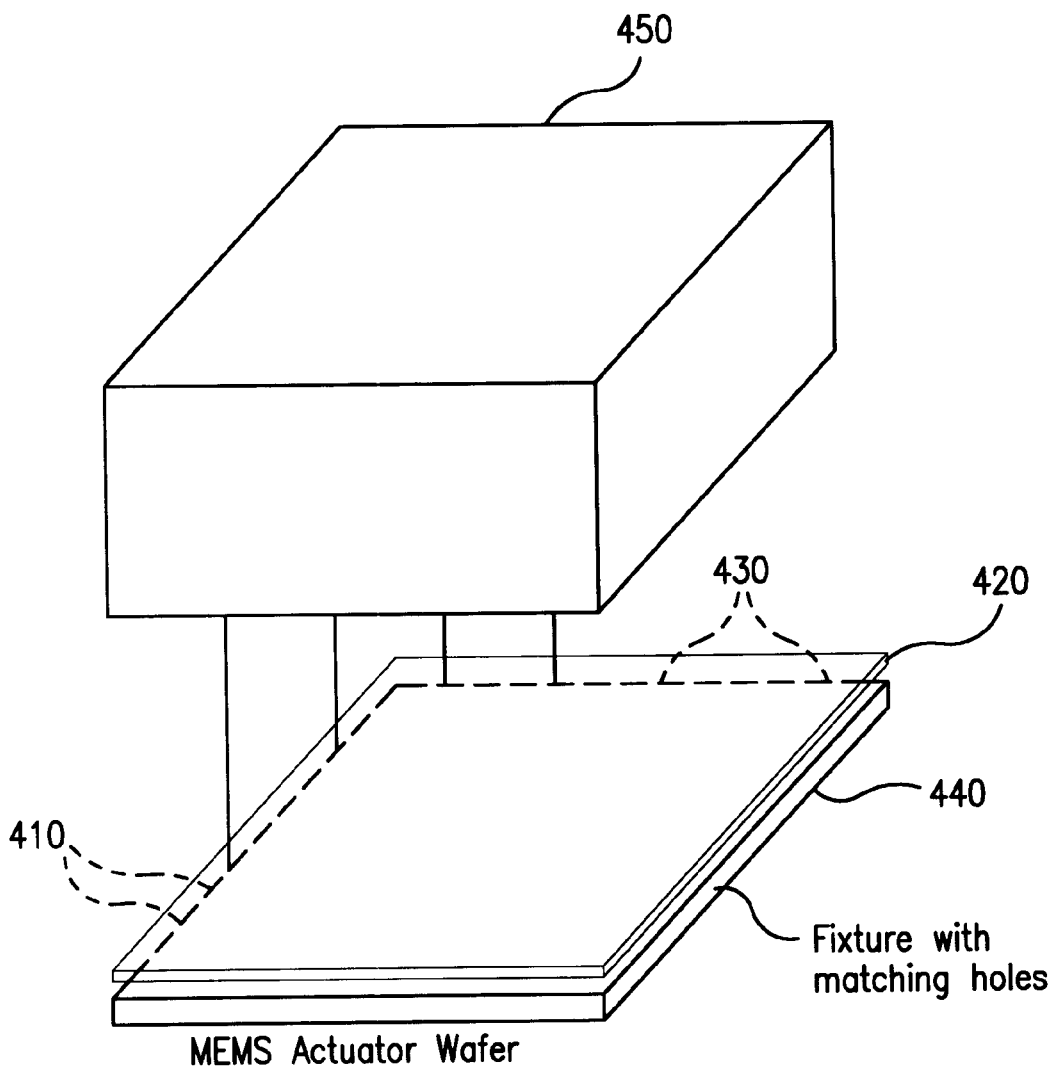
FIG. 4 illustrates a schematic perspective view of a wafer scale assembly method, representing an embodiment of the invention.

Referring to FIG. 4, the mirror blocks 410 can be dropped into a fixture 420 with arrays of alignment grooves (not shown) and holes 430. The fixture 420 is aligned with an actuator wafer 440. The mirror blocks for the entire N×M switch array can then be bonded to actuator wafer simultaneously. A weight 450 can be applied to exert a force to assist in the bonding. The attachment of micromirror blocks can also extended to fluidic self-assembly, voltage assisted self-assembly, DNA-assisted self assembly, magnetic assisted self-assembly, etc. A significant advantage of this self-assembly process is that no individual mirror placement or alignment is needed. A further advantage of this approach is that very high quality mirrors can be obtained by low-cost fabrication processes.

C. Tilt-Insensitive Micromirrors

The invention includes optomechanical matrix switches based on tilt-insensitive mirrors. Because of the long optical path between the micromirrors and the output fibers in large N×M (e.g., N×N) matrix switches, one of the most critical parameters for the micromirrors is tilt angle.

Referring to FIG. 5A, an optomechanical matrix switch 510 is depicted. The switch 510 includes a plurality of optomechanical switching cells 520. FIGS. 5B–5C illustrate sections taken along line AA in FIG. 5A. Referring to FIG. 5B, in the ideal case, the cells 520 do not exhibit mirror tilting. Referring to FIG. 5C, when a tilt is present, it results in walk-off of the output optical beams reflected from different micromirrors. This will result in large variation of the output coupling efficiency (insertion loss). The invention can include the use of orthogonally arranged mirror facets that will significantly reduce the tilt sensitivity. Instead of using flat micromirrors as shown in FIGS. 5A–5C, a two-dimensional (2D) retroreflector can be used to direct input beams to the output fibers.

Referring to FIGS. 6A–6C, an embodiment of the tilt-insensitive mirror invention is illustrated. Referring to FIG. 6A, a micro retroreflector 610 composes part of an optomechanical switching cell 620. The principle of the operation of the retroreflector 610 is shown in FIGS. 6A–6C. When the retroreflector 610 is titled as in FIG. 6C, the reflected beams are still parallel to the input beam, and the walk-off problem is substantially eliminated. The retroreflectors can be termed corner cubes. The essential elements of a corner cube is two orthogonal mirrors.

D. Microactuated Optomechanical Switching Cells

Using the wafer scale mirror attachment and self assembly fabrication methods described above, many different types of switching cells can be realized. Some specific examples of optomechanical switching cells suitable for N×M micro electro mechanical systems (MEMS) switches follow.

EXAMPLE (1)

The CMOS (complementary metal-oxide-semiconductor) transistor process is a low-cost commercial foundry process. Various types of micro electro mechanical systems actuators can be made using the CMOS technology. The main issue for fabricating optical matrix switches using CMOS is the difficulty of integrating high quality vertical micromirrors with the microactuators. Wafer-scale micromirror bonding techniques are particularly well suited to making CMOS-based micro electro mechanical systems optomechanical matrix switches. Two specific subexamples directed to specific types of CMOS microactuators include a thermal actuator and a parallel plate actuator.

Figure 7:
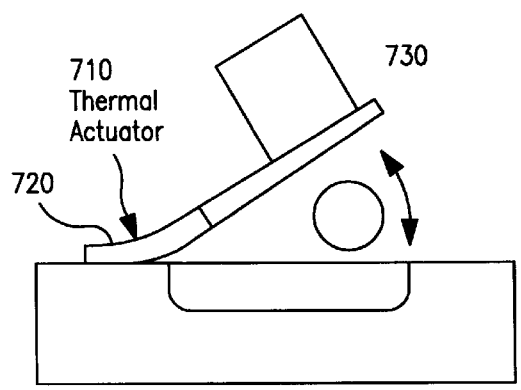
FIG. 7 illustrates a schematic side view of a thermal actuator based switch, representing an embodiment of the invention.

Referring to FIG. 7, a CMOS thermal actuator includes a cantilever beam 710 with materials of very different thermal expansion coefficients. A first material 720 of higher thermal expansion coefficient will shrink when the temperature is reduced, and deflect the cantilever beam 710 upward, if the left edge of a second material 730 (of lower expansion coefficient) is prevented from sliding to the left by a structure (not shown).

Figure 8:
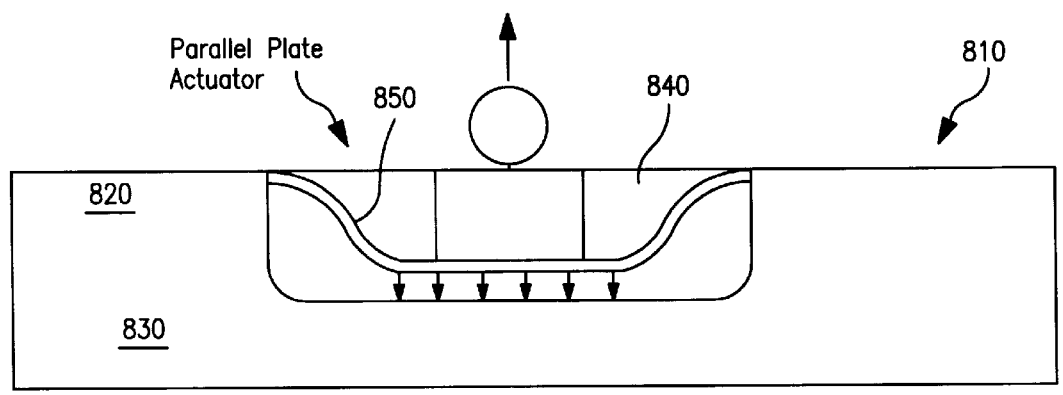
FIG. 8 illustrates a schematic side view of a parallel plate based switch, representing an embodiment of the invention.

Referring to FIG. 8, a parallel plate actuator can be realized by undercutting a CMOS multilayer structure 810 with selective etching. Parallel plate actuators are electrostatic force between two parallel plates to move one moveable plate towards the other fixed plate. By applying a bias between an upper CMOS layer 820 and a bottom 830 of an etched cavity 840, a suspended CMOS plate 850 can be attracted downward.

An alternative CMOS embodiment is two plates that form a wedge rather than a parallel structure (e.g., a > shape). In this embodiment, assuming the lower plate is fixed, displacing the radially supported actuator (upper plate) toward, or away from, the lower plate will open and close the wedge. The main advantages of the CMOS actuators include low cost, broad availability of CMOS process, and monolithic integration with CMOS drive electronics.

EXAMPLE (2)

Another example includes stress-induced electrostatic gap-closing actuators with bonded vertical micromirror. A stress can be used to generate an electric field using a piezoelectric structure.

EXAMPLE (3)

Another example includes a torsion plate with bonded vertical micromirror. The torsion plate includes a micromachined plate that is mechanically hinged about a pivot axis to a substrate.

EXAMPLE (4)

Another example includes a torsion plate with a permalloy layer and bonded vertical micromirrors. Permalloy is a brand name for any of a class of alloys of high magnetic permeability containing from approximately 30 to approximately 90 percent, by weight, of nickel. Thus, the torsion plate can be displaced with a magnetic field.

EXAMPLE (5)

Another example includes a vertical mirrors on torsion plate configured to move with a push-pull electrostatic force. Thus, the torsion plate can be displaced with an electric field.

E. Matrix Switch Architecture for Uniform Fiber Coupling Loss

Most of the volume of an optomechanical matrix switch is composed of an array of free-space optical switches, an input fiber array, and an output fiber array. Such arrangement, however, has non-uniform optical insertion losses. In more detail, assuming the ends of the fiber are coplanar, the optical path length is different when each switching cell is activated (e.g., the optical path length of input #1 to output #1 is less than that of input #1 to output #8).

Figure 9A:
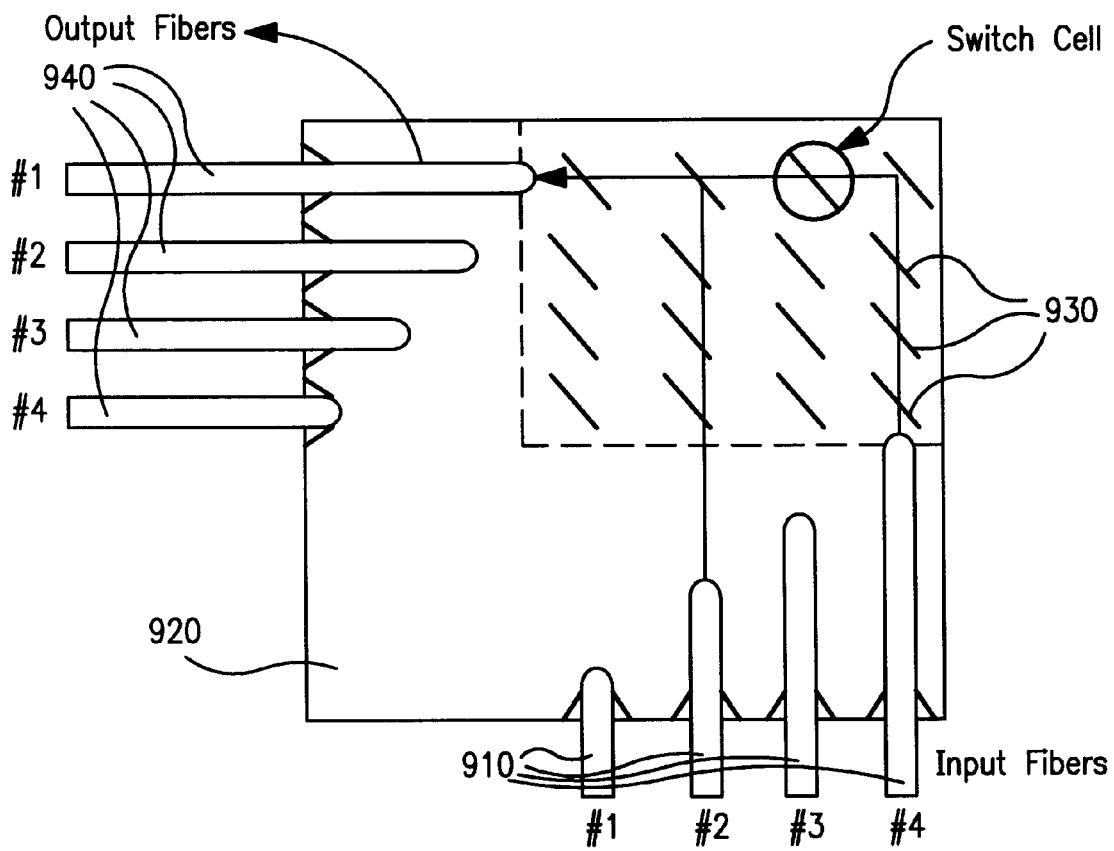
FIGS. 9A–9B illustrate schematic views of a matrix architecture with uniform optical coupling loss, representing an embodiment of the invention.
Figure 9B:
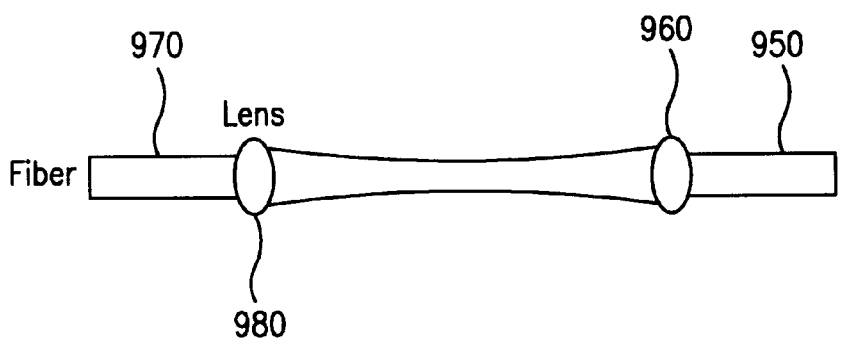

Referring to FIGS. 9A–9B, the invention includes an optomechanical matrix switch architecture that will have uniform optical coupling loss, independent of which switch is activated. A series of input fibers 910 are coupled to a substrate 920. An array of optomechanical switching cells 930 is arranged on the substrate 920. A series of output fibers 940 are also connected to the substrate 920. By staggering the input and output fibers with increments equal to the size of the switch cell, an equal optical path length is approximated. Thus, it can be appreciated that the path length from input fiber #4 to output fiber #1 is approximately equal to the path length from input fiber #2 to output fiber #1. The staggered configuration depicted in FIG. 9A will result in a more uniform optical-insertion loss.

Referring to FIG. 9B, an input fiber 950 can be provided with a lens 960. Similarly, an output fiber 970 can be provided with a lens 980.

F. Matrix Switch with On-Chip Input/Output Power Monitoring

Monitoring of the input and output powers of an optical matrix switch is very desirable for the application of the switch in telecommunication networks. Power monitoring can be effected with photodetector arrays. Because of the compact construction, the micro electro mechanical systems optomechanical switch of the invention offers unique advantages for integrating the photodetector arrays on the switch chip for power monitoring. The cost of adding this function to the switch is much lower for the monolithic micro electro mechanical systems switches than for macro scale optomechanical switches.

Figure 10A:
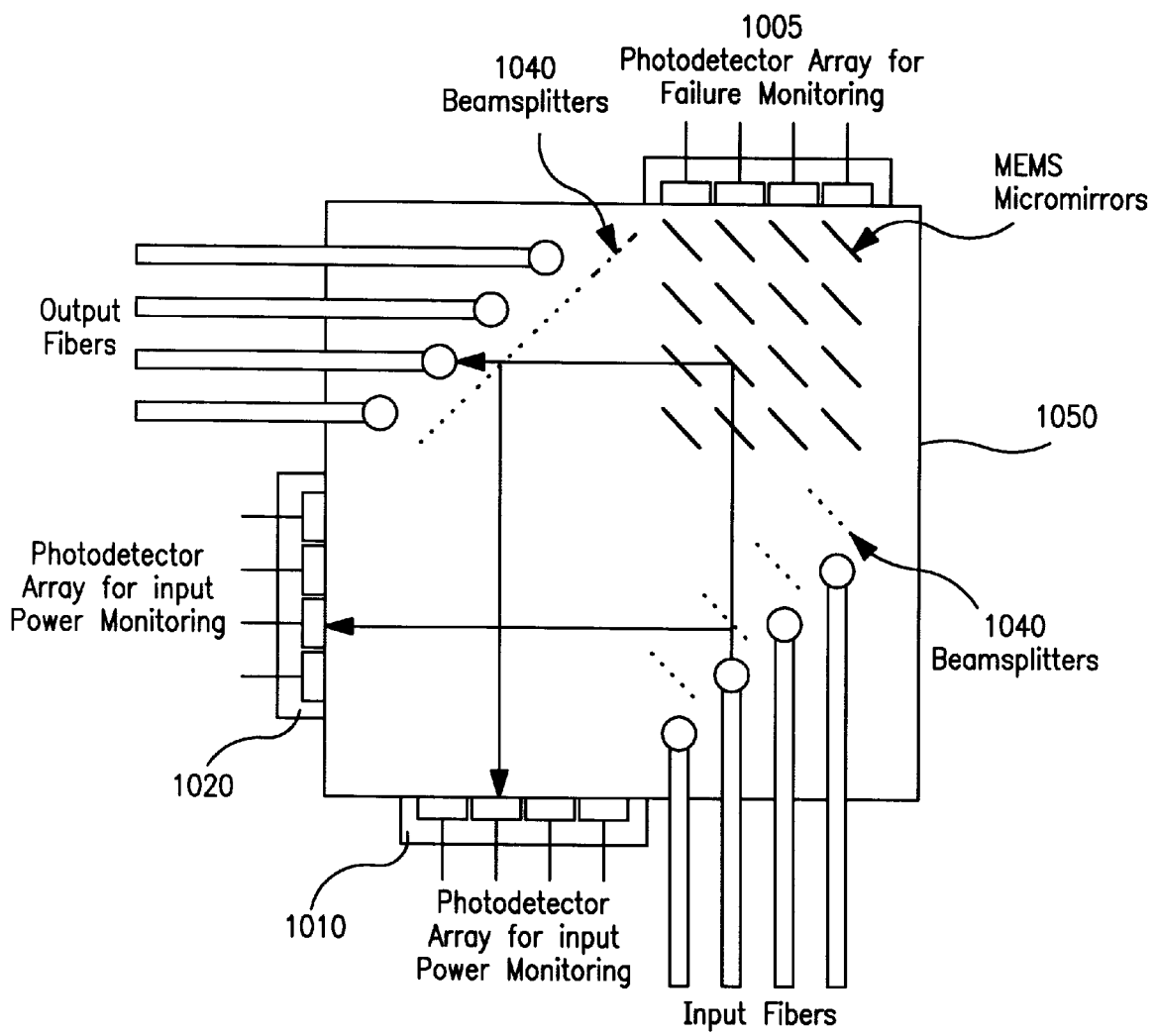
FIGS. 10A–10C illustrate schematic views of two types of power monitoring capable matrixes, representing two embodiments of the invention.
Figures 10B, 10C:
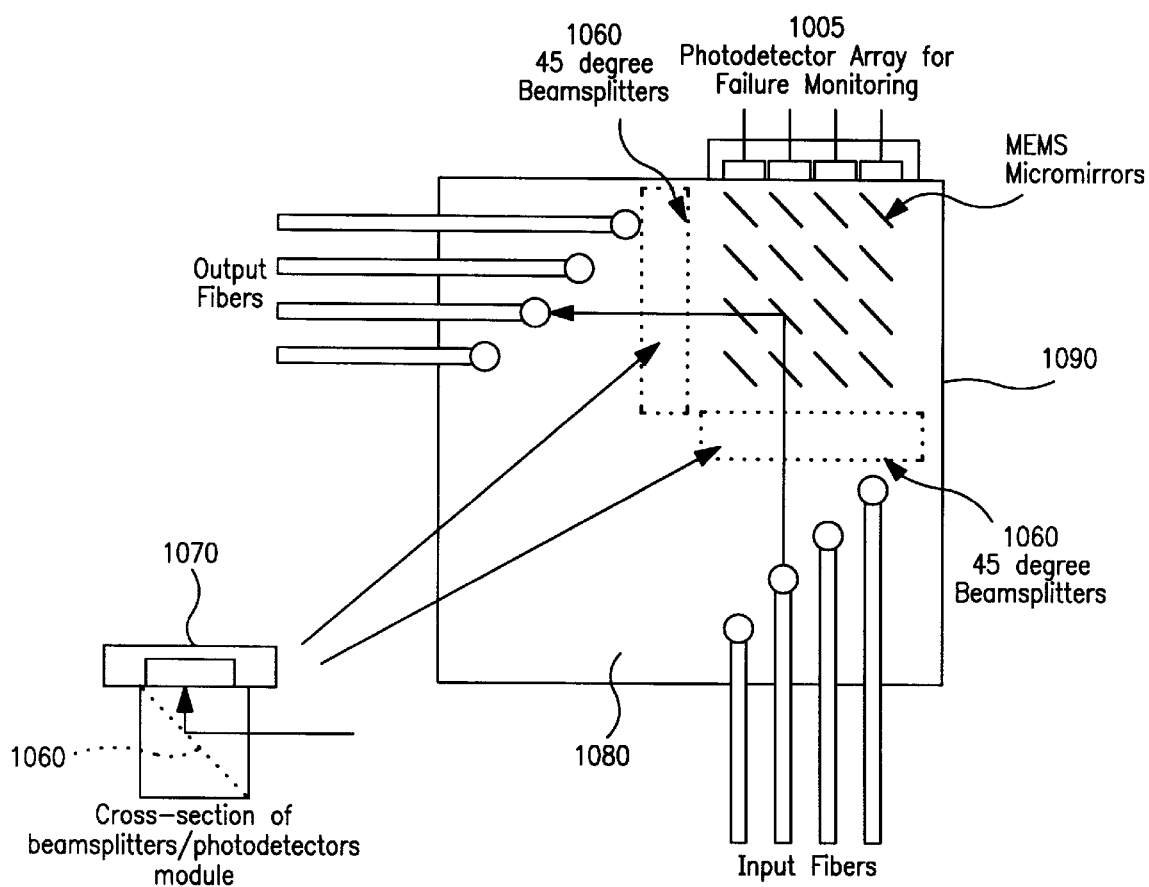

FIGS. 10A–10B illustrate two architectures of the micro electro mechanical systems optical switch with input/output power monitoring capabilities. Referring to FIG. 10A, a plurality of vertical beamsplitters 1040 can be employed to deflect part of the optical beams to an input photodetector array 1010 and an output photodetector array 1020. The deflection in this embodiment is coplanar with a substrate 1050.

Referring to FIGS. 10B-14 10C, in an alternative embodiment, a plurality of 45° beamsplitters 1060 can be employed to reflect part of the optical beams out of the switch plane to the photodetector arrays 1070 above the micro electro mechanical systems optical switch chip 1080. The deflection in this embodiment is perpendicular to a substrate 1090.

In either embodiment, the beamsplitters should be almost transparent (e.g., 1% reflection) to reduce the optical insertion loss. The beamsplitters 1040 in FIG. 10(*a*) could be monolithically fabricated with the micro electro mechanical systems chip using the surface-micromachining microhinge technique. It is also possible to mount high quality external beamsplitters on the chip. The beamsplitters 1060 in FIGS. 10B–10C could be fabricated monolithically, or attached to the packages of the photodetector arrays so that the beamsplitter/photodetectors could be simply dropped onto the micro electro mechanical systems switch chip.

In either embodiment, with the unique micro electro mechanical systems optical switch construction, it is also possible to attach a photodetector array 1005 at the opposite end of the input fibers to monitor possible failure micro electro mechanical systems micromirrors. For normal switch operation, at least one of the micromirrors in each column will be turned on. Therefore, no photocurrent will be registered in the photodetector array 1005. By combining information from the photodetector array 1005 with information from the output power monitoring, it is possible to identify failed micromirrors. A suitable photo-detector device can be provided by a p-n junction, for example, In Ga As, or Silicon or GaAs.

G. Optomechanical Matrix Switch with Integrated Microlenses

The size of the micro electro mechanical systems optical switch is limited by the maximum coupling distance between the input and the output fibers. To facilitate optical alignment, fiber collimators are employed for both input and output fibers. The maximum coupling distance between the input and output collimators determines the maximum size of the switch. For example, if the maximum coupling distance is 2 cm, and the switch cell area is 1 mm×1 mm, then the largest switch that can be realized is 10×10. To increase the dimension of the switch, it is therefore desirable to be able to extend the coupling distance without sacrificing the coupling efficiency.

Figures 11A, 11B, 11C:
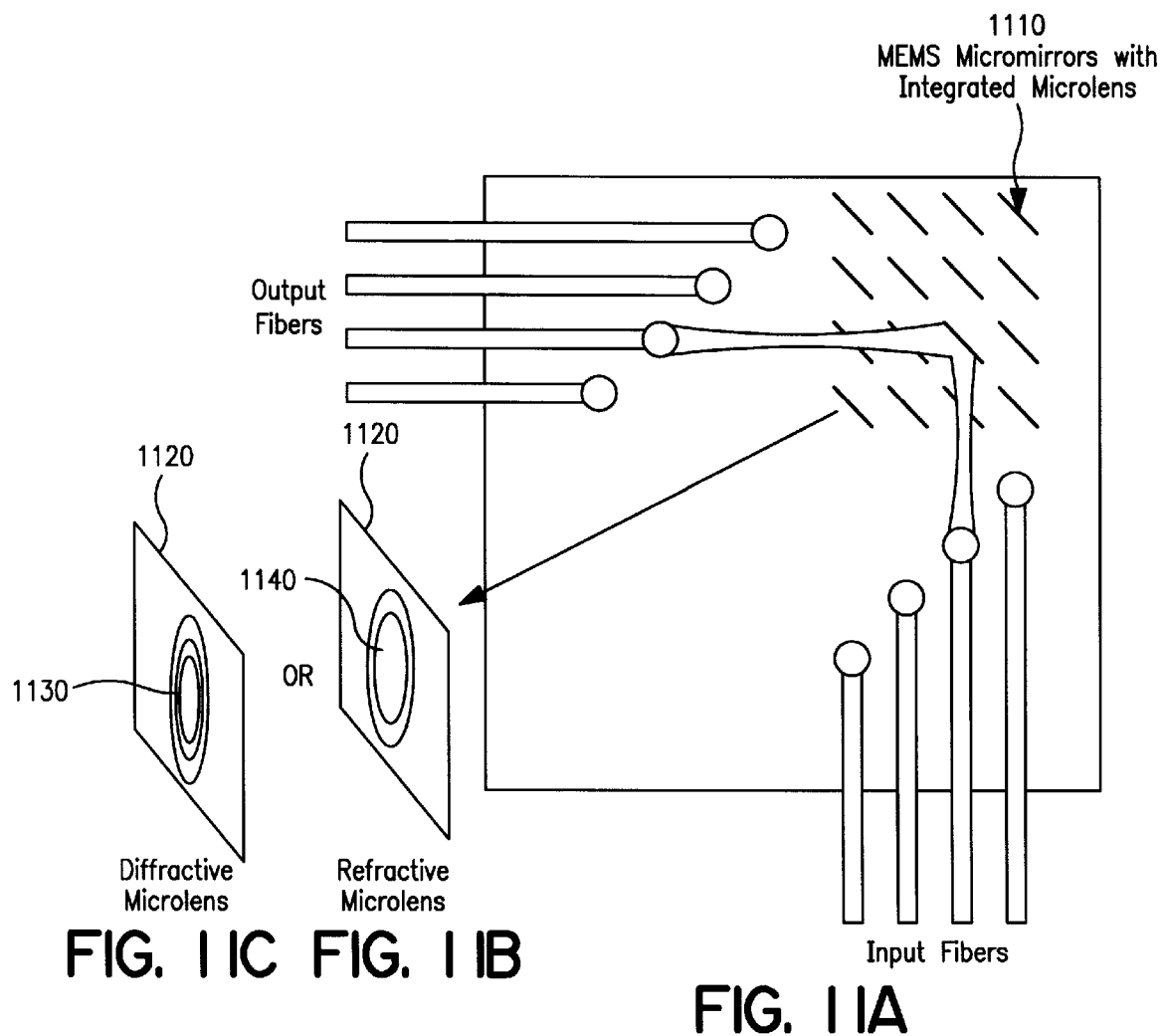
FIGS. 11A–11C illustrate schematic views of a matrix having switches with integrated microlenses, representing two embodiments of the invention.

Referring to FIGS. 11A–11C, the invention includes integrating microlenses on the micro electro mechanical systems optomechanical switching cells 1110. This will extend the coupling distance without sacrificing the coupling efficiency. Referring to FIGS. 11B–11C, the microlenses can be directly formed on the surface of the micromirror 1120. FIG. 11C illustrates a schematic drawings of the micromirror 1120 with an integrated diffractive microlens 1130. FIG. 11B illustrates a schematic drawing of the micromirror 1120 with an integrated refractive microlens 1140. The microlenses function as relay lenses to extend the coupling distance while maintaining the same optical insertion loss. It is noted that the microlens for each micromirror should be different for uniform coupling efficiency.

The diffractive and refractive microlenses 1130 and 1140 can be integrated with surface-micromachined micro electro mechanical systems structures. A refractive lens can be integrated on a micro electro mechanical systems flip up structure.

The integrated microlens acts as a relay lens. As the beam is loosing collimation, these integrated microlenses bring the beam back into collimation (parallel beams once again). Refractive lenses can be made with grinding glass, or moulding glass, or putting a gradient index in a cylinder of glass (GRIN). Diffractive lenses can be made by moulding or etching indentations in a piece of glass or other material according to a computer generated set of masks.

Figure 12:
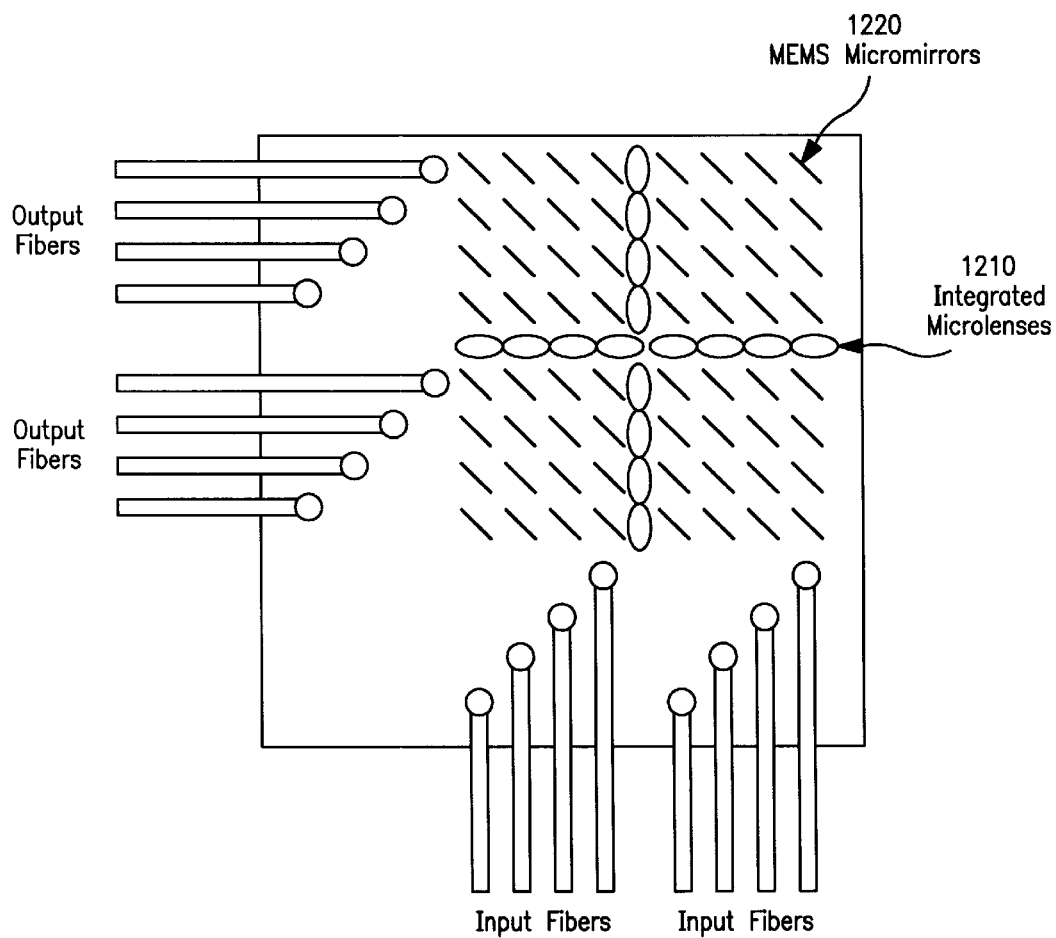
FIG. 12 illustrates a schematic top view of a matrix having switches and microlenses, representing an embodiment of the invention.

Referring to FIG. 12, a plurality of microlenses 1210 can also be integrated in between two of a plurality of micro electro mechanical systems micromirrors 1220 to extend the coupling distance. This is equivalent to stitching smaller micro electro mechanical systems optical switches together to form a larger dimension switch while maintaining almost the same optical insertion loss.

In either the embodiment shown in FIGS. 11A–11C, or the embodiment shown in FIG. 12, without the microlenses, due to Gaussian optics, the collimated beam will diverge again after a certain distance. This is known as throw distance. For large matrix switches it is highly desirable for the beam to stay collimated (otherwise it will become bigger than the switch and clipping loss will occur). Having another lens to "help" it stay collimated is the main purpose of integrating the lens onto the mirror itself.

H. Matrix Switch with Integrated WDM Components

Figure 13:
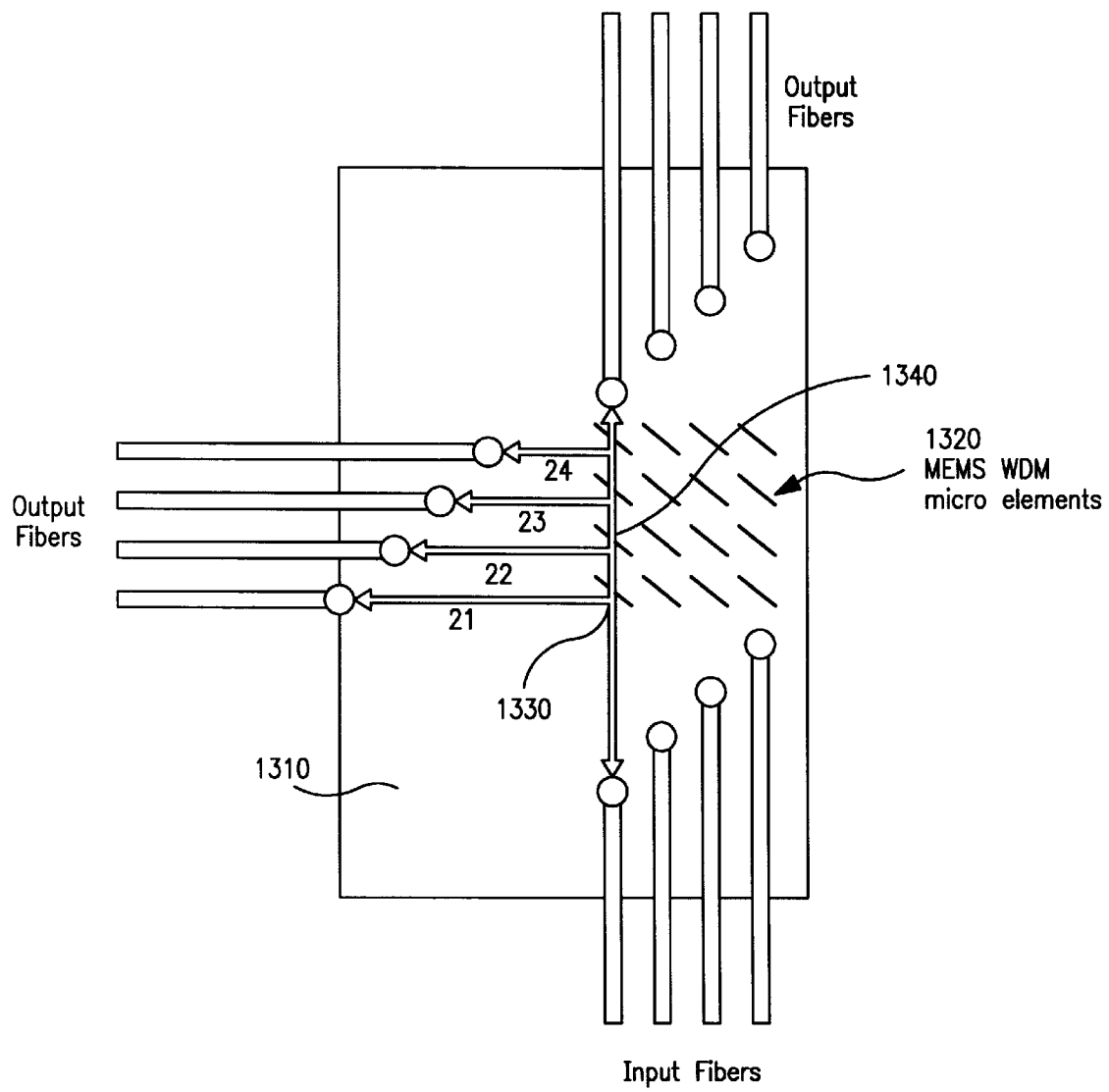
FIG. 13 illustrates a schematic top view of a matrix having switches with wave division multiplexing functionality, representing an embodiment of the invention.

Referring to FIG. 13, the invention includes providing an optomechanical matrix switch 1310 with one or more wavelength division devices 1320. The wavelength division devices 1320 can include wavelength division multiplexers and/or wavelength division demultiplexers. The wavelength-division-multiplexing (WDM) components can be integrated with the micro electro mechanical systems optical switch to form more functional WDM micro electro mechanical systems switches. One particular embodiment of such device is shown in FIG. 13. Instead of micromirrors, the embodiment depicted in FIG. 13 includes WDM components. For example, a first WDM micromirror 1330 reflects wavelength λ1 only when the mirror is turned on; a second WDM micromirror 1340 reflects λ2 only when the WDM mirror is turned on; etc. Such a device can perform selective WDM add-drop multiplexing as well as optical switching. It is more powerful than combining discrete optical switches and external WDM multiplexers and/or demultiplexers. This means that the switch can be combined with WDM multiplexers/demultiplexers to form wavelength-selective add/drop filters that are programmable. It is better than combining a separate switch and a separate WDM filter because the coupling loss is reduced (there is no need to couple into fiber and then expand the beam from the fiber again).

I. Matrix Switch with On-Chip Hermetic Sealing

Hermetic sealing is very important for the operation of micro electro mechanical systems actuators and to reduce in-use stiction. Conventional hermetic sealing is applied at the package level.

The invention includes on-chip hermetic sealing. On-chip hermetic sealing is very attractive for optical micro electro mechanical systems devices. Since the micro electro mechanical systems optomechanical devices are accessed by optical beams, the micro electro mechanical systems optomechanical devices can actually be sealed before dicing the chip.

Figure 14:
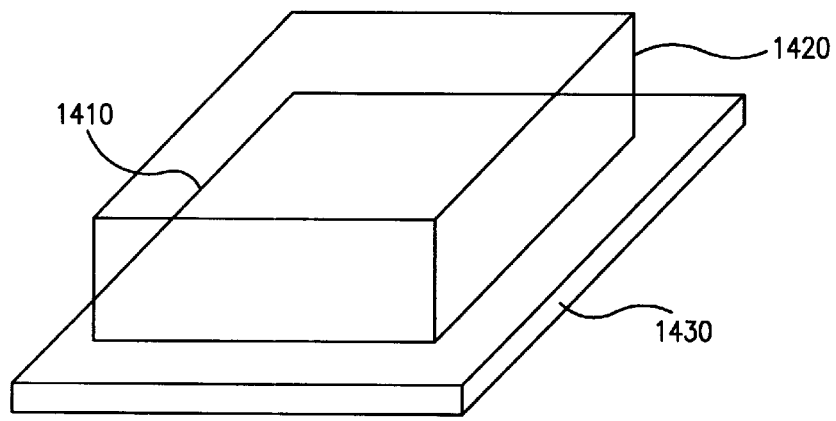
FIG. 14 illustrates a schematic perspective view of a matrix with on-chip hermetic sealing, representing an embodiment of the invention.

Referring to FIG. 14, an optomechanical matrix switch 1410 with on-chip hermetic sealing feature is depicted. A sealing structure 1420 (e.g., a transparent cap) is connected to a substrate 1430.

In this way, the micro electro mechanical systems optomechanical matrix switches can be fabricated by connecting the mirrors to the actuators at a wafer scale. Then the constraining structure that holds the actuators can be released. Then the devices can be hermetically sealed with the transparent cap. After sealing, the wafer can be treated as integrated circuit (IC) wafers, and be diced.

J. Alignment of Matrix Switch with Fiber Ribbons

One of the unique advantages of the invention is the dramatically simplified optical packaging procedure. The input and output fibers can be integrated monolithically with the micro electro mechanical systems optical switching chip by etching V-grooves for aligning the fibers. This will totally eliminate the optical alignment step in packaging. However, some optical alignment may be necessary because of the non-perfect angle of the micromirrors.

The invention includes a micro electro mechanical systems optomechanical matrix switch combined with fiber ribbons. By employing fiber ribbons for the input and output fibers, the optical alignment is greatly simplified. Instead of aligning 2N individual fibers, there is only a need to align 2 fiber ribbons.

Figure 15:
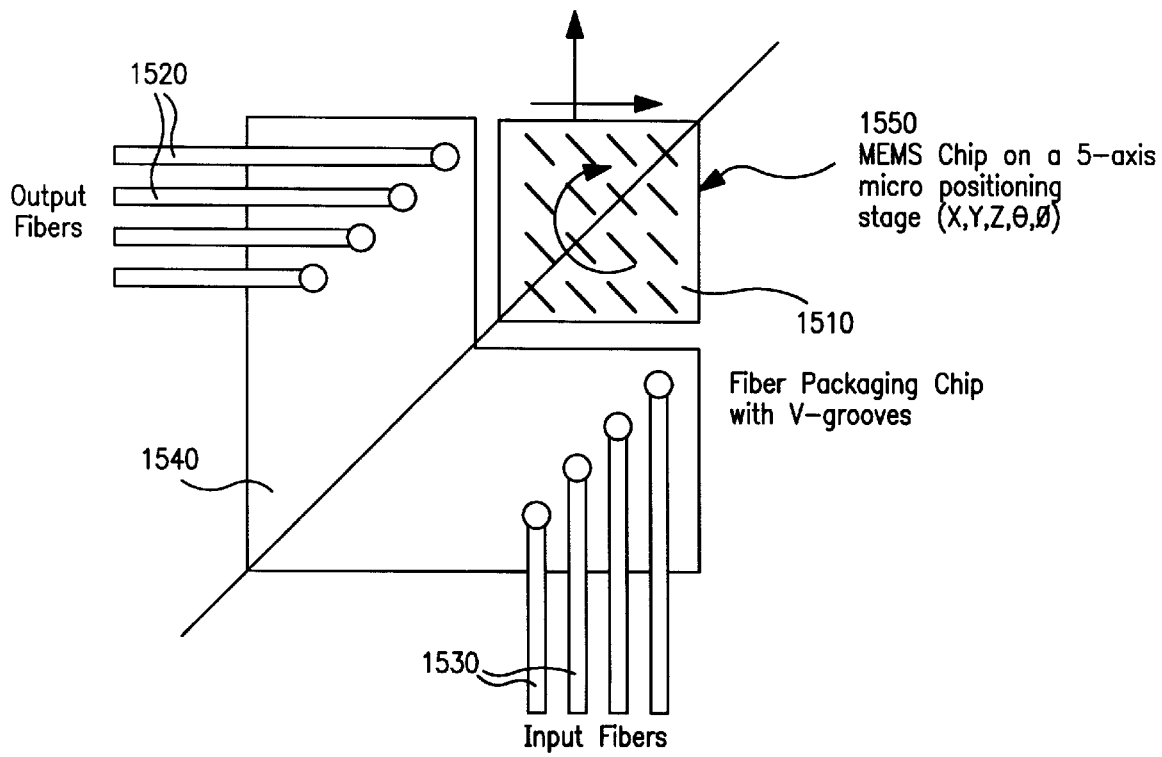
FIG. 15 illustrates a schematic top view of a matrix with switches mounted on a positioning stage, representing an embodiment of the invention.

Moreover, referring to FIG. 15, the invention also includes combining a micro electro mechanical systems optomechanical matrix switch 1510 with output fibers 1520 and input fibers 1530 located in V-grooves provided on a fiber-package chip 1540. By mounting the fiber ribbons on V-grooves on the same silicon (Si) substrate, all fibers are automatically aligned. Thus, the only alignment that needs to be effected, is alignment of the fiber-package chip 1540 to the chip upon which the micro electro mechanical systems optomechanical matrix switch 1510 is located.

Still referring to FIG. 15, by placing the micro electro mechanical systems chip on a 5-axis stage 1550 the micro electro mechanical systems chip can be perfectly aligned to the fiber-package chip.

Figure 16:
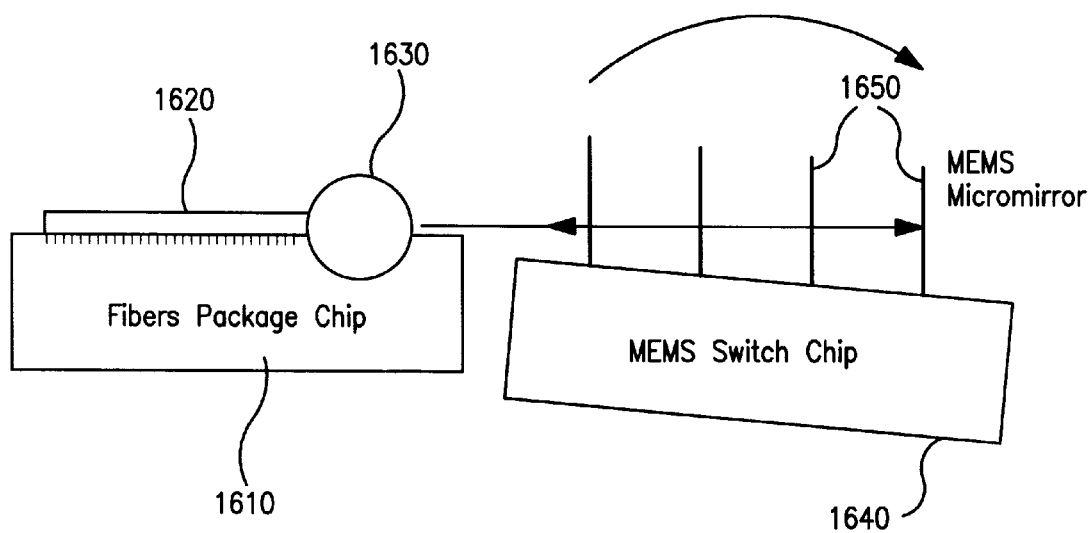
FIG. 16 illustrates a schematic side view of a matrix with switches mounted on a positioning stage.

Referring to FIG. 16, the mirror tilting angle is a critical parameter. A fiber package chip 1610 includes a plurality of optical fibers 1620 and a cylindrical lens 1630. A micro electro mechanical systems matrix switch chip 1640 includes a plurality of micro mirrors 1650. Even with perfect design, the mirror angle might still deviate slightly from 90°. With two degrees of freedom in rotation, this non-ideal mirror angle can be corrected during the packaging step. The tilt control restores the mirror to perfect 90° angle, while the rotation and linear translations accurately position the micro electro mechanical systems chip. Perfect alignment is represented in FIG. 16 by arrowheads pointing in opposite directions on a single ray.

K. 3-Port and 4-Port Matrix Switches

FIG. 17 illustratively represents a number of 3-port and 4-port matrix switches capable of being realized using the MEMS switching cells of the present invention. Referring to FIG. 17a, there is shown an optomechanical matrix switch 1700a which includes a first plurality of switching cells 1710a and a second plurality of switching cells 1720a mounted upon a substrate 1730a. The matrix switch 1700a includes first and second optical fiber input ports 1740a and 1750a in optical alignment with the first plurality of switching cells 1710a and the second plurality of switching cells 1720a, respectively. A corresponding first plurality optical fiber output ports 1760a are in optical alignment with the first plurality of switching cells 1710a and a corresponding second plurality of optical fiber output ports 1770a are in optical alignment with the second plurality of switching cells 1720a. In operation, input beams are switched from the optical fiber input port 1740a to a desired one of the optical fiber output ports 1760a by actuating the applicable one of the switching cells 1710a. In like manner input beams are switched from the optical fiber input port 1750a to a desired one of the optical fiber output ports 1770a by actuating the applicable one of the switching cells 1720a.

Figure 17A:
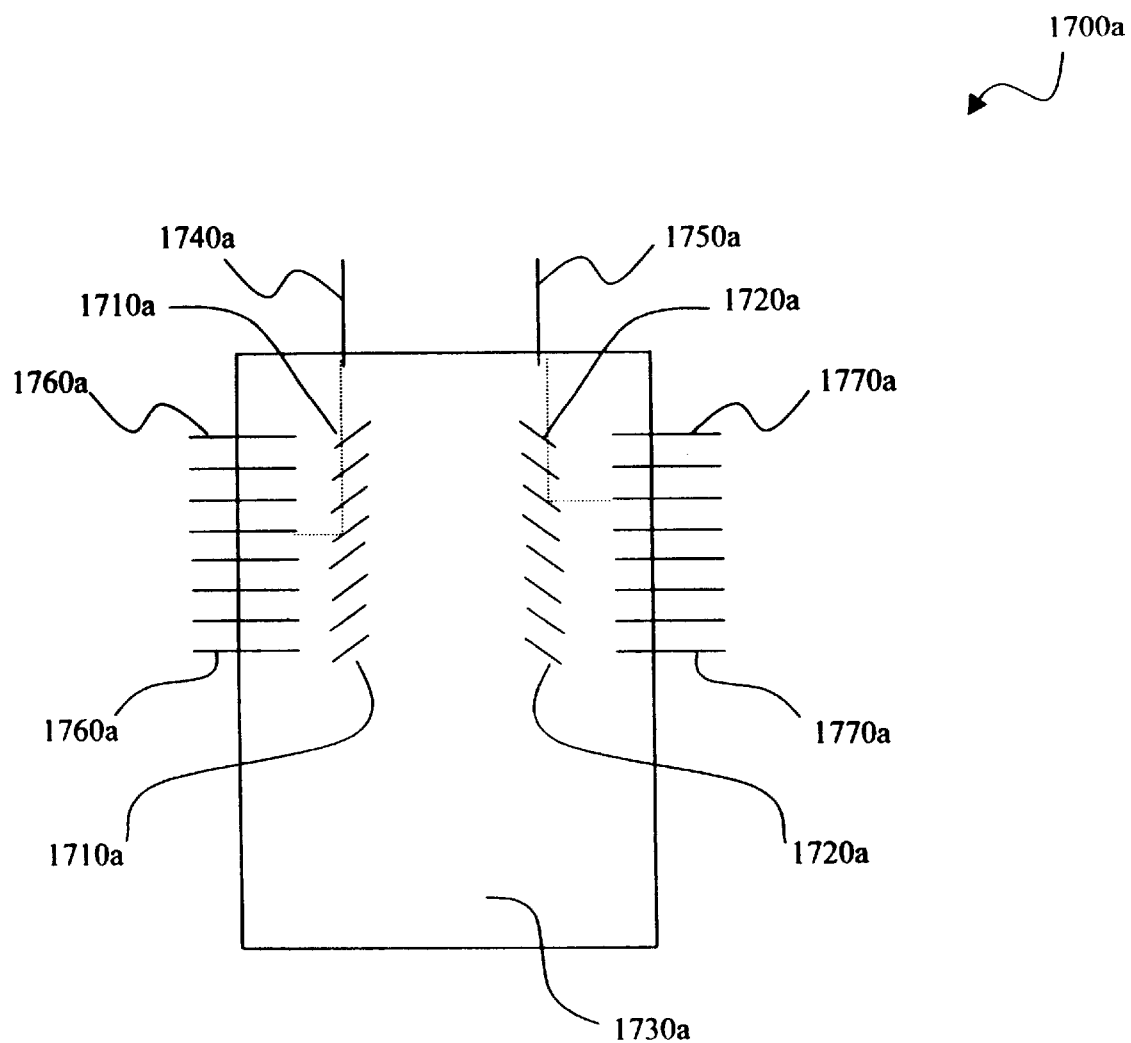
FIGS. 17a–17h illustrate implementations of optomechanical matrix switches comprised of one or more pluralities of switching cells mounted upon a substrate in optical alignment with various input/output and other ports.
Figure 17B:
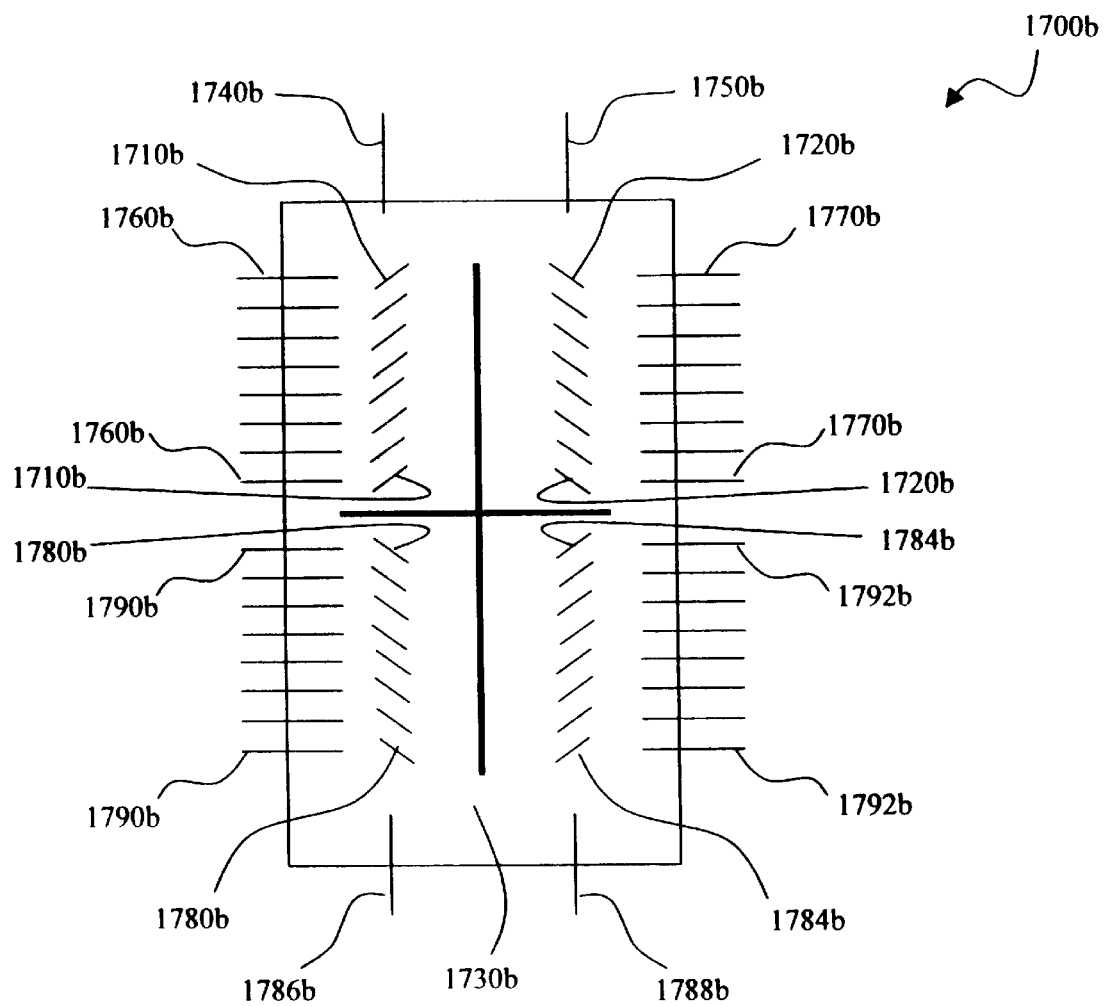

Turning now to FIG. 17b, there is shown an optomechanical matrix switch 1700b which includes a first plurality of switching cells 1710b and a second plurality of switching cells 1720b mounted upon a substrate 1730b. The matrix switch 1700b includes first and second optical fiber input ports 1740b and 1750b in optical alignment with the first plurality of switching cells 1710b and the second plurality of switching cells 1720b, respectively. A corresponding first plurality optical fiber output ports 1760b are in optical alignment with the first plurality of switching cells 1710b and a corresponding second plurality of optical fiber output ports 1770b are in optical alignment with the second plurality of switching cells 1720b. In operation, input beams are switched from the optical fiber input port 1740b to a desired one of the optical fiber output ports 1760b by actuating the applicable one of the switching cells 1710b. In like manner input beams are switched from the optical fiber input port 1750b to a desired one of the optical fiber output ports 1770b by actuating the applicable one of the switching cells 1720b.

The optomechanical matrix switch 1700b also includes a third plurality of switching cells 1780b and a fourth plurality of switching cells 1784b mounted upon a substrate 1730b. The matrix switch 1700b includes third and fourth optical fiber input ports 1786b and 1788b in optical alignment with the third plurality of switching cells 1780b and the fourth plurality of switching cells 1784b, respectively. A corresponding third plurality optical fiber output ports 1790b are in optical alignment with the third plurality of switching cells 1780b and a corresponding fourth plurality of optical fiber output ports 17920b are in optical alignment with the fourth plurality of switching cells 1784b. In operation, input beams are switched from the optical fiber input port 1786b to a desired one of the optical fiber output ports 1790b by actuating the applicable one of the switching cells 1780b. In like manner input beams are switched from the optical fiber input port 1788b to a desired one of the optical fiber output ports 1792b by actuating the applicable one of the switching cells 1784b.

Figure 17C:
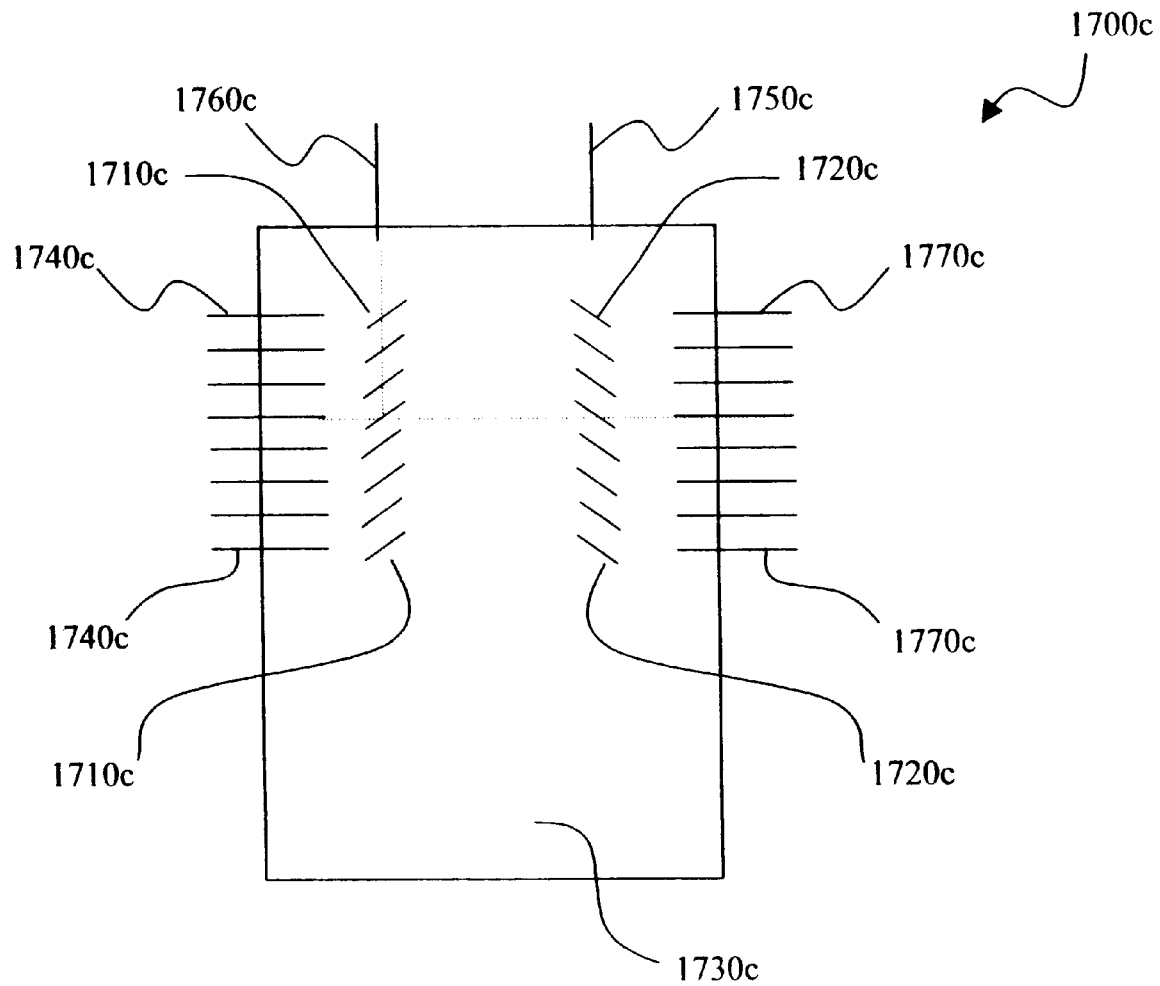

FIG. 17c depicts an optomechanical matrix switch 1700c which includes a first plurality of switching cells 1710c and a second plurality of switching cells 1720c mounted upon a substrate 1730c. The matrix switch 1700c includes first plurality of optical fiber input ports 1740c in optical alignment with the first plurality of switching cells 1710c, and an optical fiber add port 1750c in optical alignment with the second plurality of switching cells 1720c. Each of the first plurality of optical switching cells 1710c is also in optical alignment with an optical fiber drop port 1760c. In addition, a plurality of optical fiber output ports 1770c are in optical alignment with the second plurality of switching cells 1720c. In operation, input beams are switched from a selected one of the optical fiber input ports 1740c to the optical fiber drop port 1760c by actuating the applicable one of the switching cells 1710c. In a similar manner input beams are switched from the optical fiber add port 1750c to a desired one of the optical fiber output ports 1770c by actuating the applicable one of the switching cells 1720c. Alternatively, input beams from the input ports 1740c may be allowed to pass to corresponding ones of the output ports 1770c in optical alignment therewith by refraining from actuating the applicable switching cells 1710c.

Figure 17D:
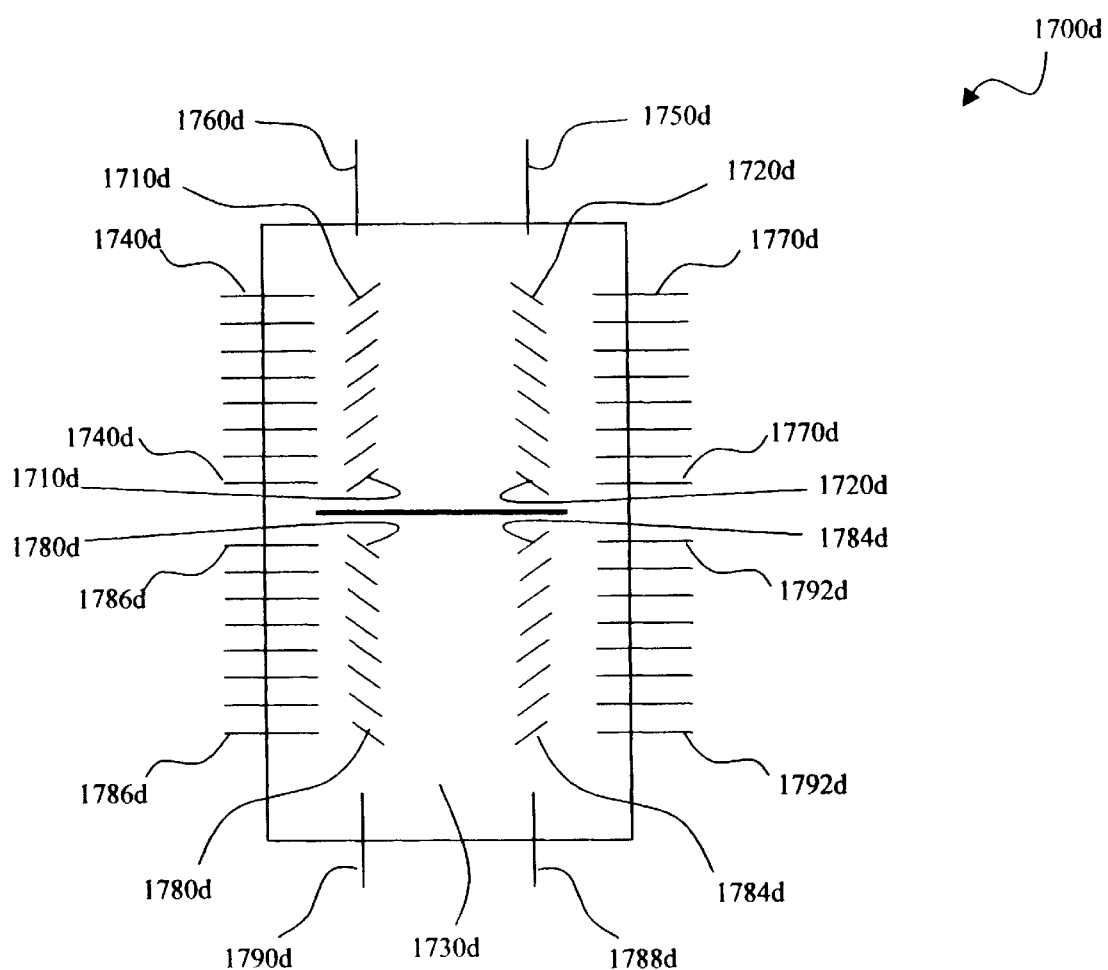

Referring to FIG. 17d, there is shown an optomechanical matrix switch 1700d including a first plurality of switching cells 1710d and a second plurality of switching cells 1720d mounted upon a substrate 1730d. The matrix switch 1700d includes a first plurality of optical fiber input ports 1740d in optical alignment with the first plurality of switching cells 1710d, and a first optical fiber add port 1750d in optical alignment with the second plurality of switching cells

1720d. Each of the first plurality of optical switching cells 1710d is also in optical alignment with a first optical fiber drop port 1760d. In addition, a first plurality of optical fiber output ports 1770d are in optical alignment with the second plurality of switching cells 1720d. In operation, input beams are switched from a selected one of the optical fiber input ports 1740d to the optical fiber drop port 1760d by actuating the applicable one of the switching cells 1710d. In a similar manner input beams are switched from the optical fiber add port 1750d to a desired one of the optical fiber output ports 1770d by actuating the applicable one of the switching cells 1720d. Alternatively, input beams from the input ports 1740d may be allowed to pass to corresponding ones of the output ports 1770d in optical alignment therewith by refraining from actuating the applicable switching cells 1710d.

The optomechanical matrix switch 1700d further includes a third plurality of switching cells 1780d and a fourth plurality of switching cells 1784d mounted upon the substrate 1730d. The matrix switch 1700d also includes a third plurality of optical fiber input ports 1786d in optical alignment with the third plurality of switching cells 1780d, and a second optical fiber add port 1788d in optical alignment with the second plurality of switching cells 1784d. Each of the third plurality of optical switching cells 1780d is also in optical alignment with a second optical fiber drop port 1790d. In addition, a second plurality of optical fiber output ports 1792d are in optical alignment with the second plurality of switching cells 1784d. In operation, input beams are switched from a selected one of the optical fiber input ports 1786d to the optical fiber drop port 1790d by actuating the applicable one of the switching cells 1780d. In a similar manner input beams are switched from the optical fiber add port 1788d to a desired one of the optical fiber output ports 1792d by actuating the applicable one of the switching cells 1784d. Alternatively, input beams from the input ports 1786d may be allowed to pass to corresponding ones of the output ports 1792d in optical alignment therewith by refraining from actuating the applicable switching cells 1780d.

Figures 17E, 17F:
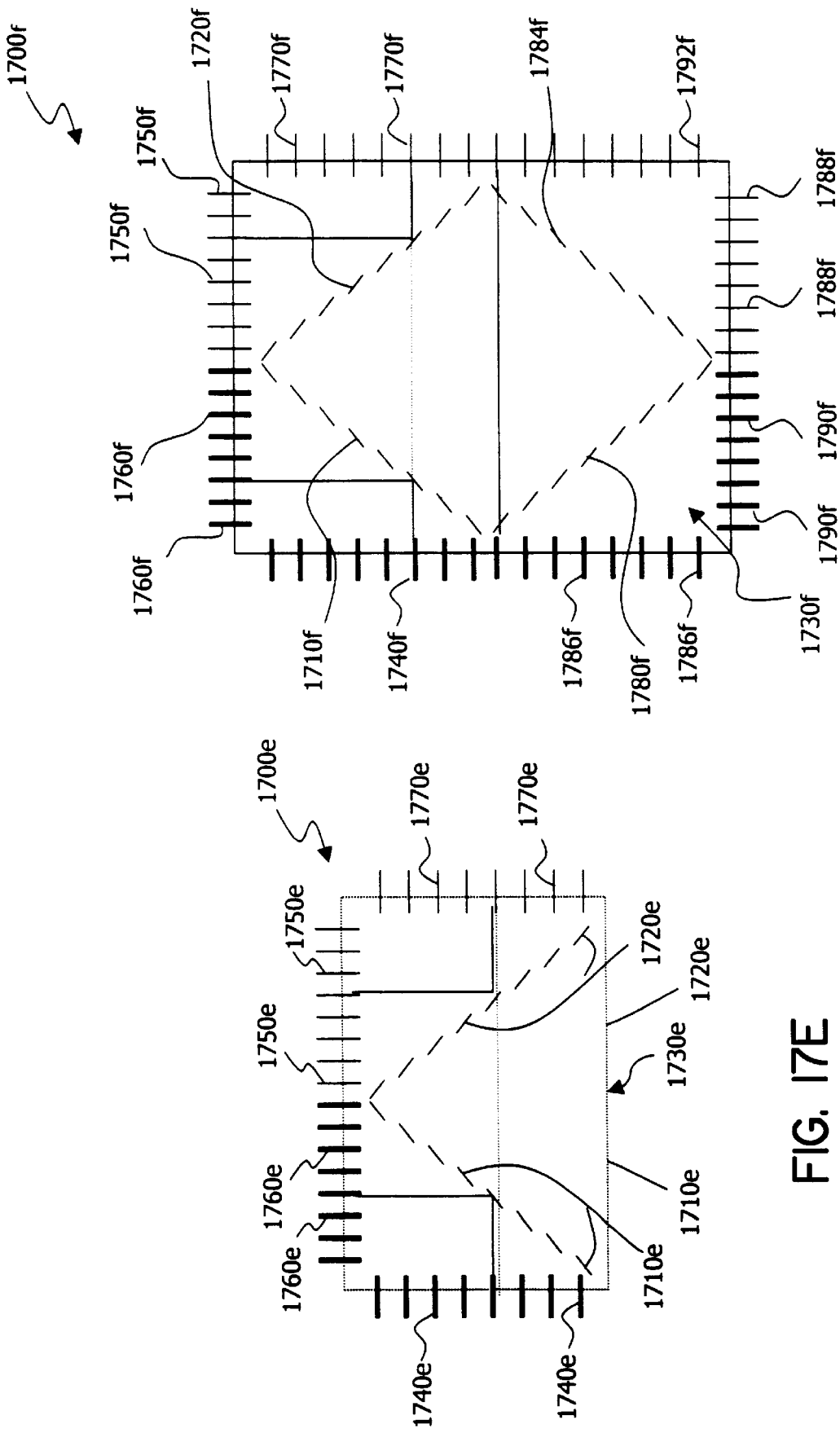

Turning now to FIG. 17e, there is shown an optomechanical matrix switch 1700e including a first plurality of switching cells 1710e and a second plurality of switching cells 1720e mounted upon a substrate 1730e. The matrix switch 1700e includes a plurality of optical fiber input ports 1740e in optical alignment with the first plurality of switching cells 1710e, and a plurality optical fiber add ports 1750e in optical alignment with the second plurality of switching cells 1720e. Each of the plurality of optical switching cells 1710e is also in optical alignment with a corresponding one of a plurality of optical fiber drop ports 1760e. In addition, a first plurality of optical fiber output ports 1770e are in optical alignment with the second plurality of switching cells 1720e. In operation, input beams are switched from a selected one of the optical fiber input ports 1740e to a corresponding one of the optical fiber drop ports 1760e by actuating the applicable one of the switching cells 1710e. In a similar manner input beams are switched from a selected one of the optical fiber add ports 1750e to a desired one of the optical fiber output ports 1770e by actuating the applicable one of the switching cells 1720e. Alternatively, input beams from the input ports 1740e may be allowed to pass to corresponding ones of the output ports 1770e in optical alignment therewith by refraining from actuating the applicable switching cells 1710e.

FIG. 17f provides an illustrative representation of an optomechanical matrix switch 1700f including a first plurality of switching cells 1710f and a second plurality of switching cells 1720f mounted upon a substrate 1730f. The matrix switch 1700f includes a first plurality of optical fiber input ports 1740f in optical alignment with the first plurality of switching cells 1710f, and a first plurality optical fiber add ports 1750f in optical alignment with the second plurality of switching cells 1720f. Each of the plurality of optical switching cells 1710f is also in optical alignment with a corresponding one of a first plurality of optical fiber drop ports 1760f. In addition, a first plurality of optical fiber output ports 1770f are in optical alignment with the second plurality of switching cells 1720f. In operation, input beams are switched from a selected one of the optical fiber input ports 1740f to a corresponding one of the optical fiber drop ports 1760f by actuating the applicable one of the switching cells 1710f. In a similar manner input beams are switched from a selected one of the optical fiber add ports 1750f to a desired one of the optical fiber output ports 1770f by actuating the applicable one of the switching cells 1720f. Alternatively, input beams from the input ports 1740f may be allowed to pass to corresponding ones of the output ports 1770f in optical alignment therewith by refraining from actuating the applicable switching cells 1710f.

The optomechanical matrix switch 1700f further includes a third plurality of switching cells 1780f and a fourth plurality of switching cells 1784f mounted upon the substrate 1730f. The matrix switch 1700f includes a second plurality of optical fiber input ports 1786f in optical alignment with the third plurality of switching cells 1780f, and a second plurality optical fiber add ports 1788f in optical alignment with the fourth plurality of switching cells 1784f. Each of the plurality of optical switching cells 1780f is also in optical alignment with a corresponding one of a second plurality of optical fiber drop ports 1790f. In addition, a second plurality of optical fiber output ports 1792f are in optical alignment with the fourth plurality of switching cells 1784f. In operation, input beams are switched from a selected one of the optical fiber input ports 1786f to a corresponding one of the optical fiber drop ports 1790f by actuating the applicable one of the switching cells 1780f. In a similar manner input beams are switched from a selected one of the optical fiber add ports 1788f to a desired one of the optical fiber output ports 1792f by actuating the applicable one of the switching cells 1784f. Alternatively, input beams from the input ports 1786f may be allowed to pass to corresponding ones of the output ports 1792f in optical alignment therewith by refraining from actuating the applicable switching cells 1780f.

Figure 17H:
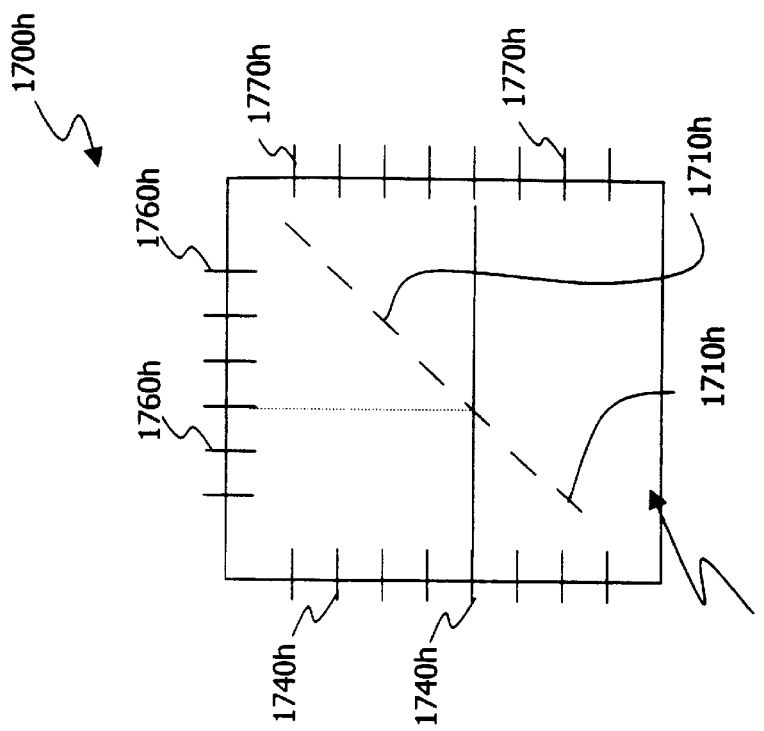
Figure 17G:
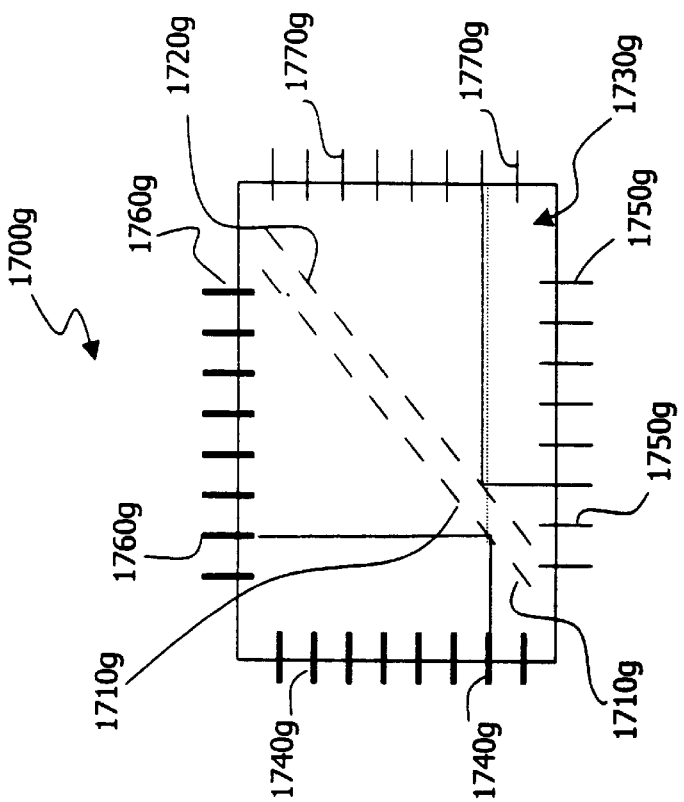

Turning now to FIG. 17g, there is shown an optomechanical matrix switch 1700g including a first plurality of switching cells 1710g and a second plurality of switching cells 1720g mounted upon a substrate 1730g. The matrix switch 1700g includes a plurality of optical fiber input ports 1740g in optical alignment with the first plurality of switching cells 1710g, and a plurality optical fiber add ports 1750g in optical alignment with the second plurality of switching cells 1720g. Each of the plurality of optical switching cells 171 0g is also in optical alignment with a corresponding one of a plurality of optical fiber drop ports 1760g. In addition, a first plurality of optical fiber output ports 1770g are in optical alignment with the second plurality of switching cells 1720g. In the implementation of FIG. 17g, the add ports 1750g are arranged along a border of the matrix switch 1700g opposite to a border along which are arranged the drop ports 1760g. In operation, input beams are switched from a selected one of the optical fiber input ports 1740g to a corresponding one of the optical fiber drop ports 1760g by actuating the applicable one of the switching cells 1710g. In a similar manner input beams are switched from a selected one of the optical fiber add ports 1750g to a desired one of the optical fiber output ports 1770g by actuating the applicable one of the switching cells 1720g. Alternatively, input beams from the input ports 1740g may be allowed to pass to corresponding ones of the output ports 1770g in optical alignment therewith by refraining from actuating the applicable switching cells 1710g.

FIG. 17h depicts an optomechanical matrix switch 1700h which includes a plurality of switching cells 1710h mounted upon a substrate 1730h. The matrix switch 1700h includes a plurality of optical fiber input ports 1740h in optical alignment with the plurality of switching cells 1710h. Each of the plurality of optical switching cells 1710h is also in optical alignment with a corresponding one of a plurality of first optical fiber output ports 1760h, and is interposed between one of the input ports 1740h and a corresponding one of a plurality of second optical fiber output ports 1760h. In operation, input beams are switched from a selected one of the optical fiber input ports 1740h to a corresponding one of the first optical fiber output ports 1760h by actuating the applicable one of the switching cells 1710h. Alternatively, input beams from the input ports 1740h may be allowed to pass to corresponding ones of the second optical fiber output ports 1770h in optical alignment therewith by refraining from actuating the applicable switching cells 1710h.

Practical Applications of the Invention

A practical application of the invention that has value within the technological arts is in telecommunication networks, optical instrumentation, and optical signal processing systems. In telecommunication networks, the invention can be applied to network restoration, reconfiguration, and dynamic bandwidth allocation. For instance, the invention can be embodied in an optical crossbar switch (N×M matrix switch) which is a general purpose switch that is very useful for reconfiguring large telecommunication fiber optic networks, restoration of services and dynamic allocation of bandwidth. There are virtually innumerable uses for the invention, all of which need not be detailed here.

Advantages of the Invention

An optomechanical switch made with micro electro mechanical systems technology offers significant advantages over conventional optomechanical switches for realizing optical crossbar switches. Since the surface area (footprint) of a micro electro mechanical systems fabricated switching cell is very small (e.g., from a few hundred micrometers to a few millimeters), an entire N×M switching matrix can be monolithically integrated on a single substrate (e.g., a single silicon integrated circuit chip). This significantly reduces the packaging cost of the switch. It also enables the entire switch to be hermetically packaged, which is a very important factor for the switch to satisfy the temperature and humidity requirements such as those in the Bellcore standard.

The switching time can also be reduced because of their higher resonant frequency. The resonant frequency is proportional to the square root of the ratio of spring constant and mass. Switch cells fabricated in accordance with the invention can be much smaller (e.g., 10–100 smaller) physically than bulk mechanical switches. Consequently, switch cells fabricated in accordance with the invention can have smaller mass and, therefore, a higher resonant frequency. The higher resonant frequency is directly proportional to the speed of switching of the device. Furthermore, an optomechanical switch made with micro electro mechanical systems technology can be more rugged than the macro-scale switches because the inertial forces are much smaller in the micro-scale switches.

All the disclosed embodiments of the invention described herein can be realized and practiced without undue experimentation. Although the best mode of carrying out the invention contemplated by the investors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the N×M matrices are described herein as physically separate modules, it is understood that the matrices may be integrated into the apparatus with which they are associated. Furthermore, all the disclosed elements and feature of each disclosed embodiment can be combined with, or substituted for, the disclosed elements and features of every other disclosed embodiment except where such elements or features are mutually exclusive.

It is understood that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. An optomechanical matrix switch, comprising:
   a substrate;
   a MEMS optomechanical switching cell, comprising:
      an electrode coupled to said substrate, said electrode capable of receiving an electrical signal;
      an actuator, movably coupled to said substrate via a hinge, said electrode and said actuator capable of generating an electrically induced force therebetween, wherein said actuator is capable of moving in response to a change in said electrically induced force; and
      a reflective element mounted to said actuator, a reflective surface of said reflective element displacing substantially in a single plane in response to movement of said actuator;
   a first plurality of said MEMS optomechanical switching cells coupled to said substrate, each of said first plurality of optomechanical switching cells in optical alignment with a first input port; and
   a second plurality of said MEMS optomechanical switching cells coupled to said substrate, each of said second plurality of optomechanical switching cells in optical alignment with a second input port.

2. An optomechanical matrix switch, comprising:
   a substrate;
   a MEMS optomechanical switching cell, comprising:
      an electrode coupled to said substrate, said electrode capable of receiving an electrical signal;

an actuator, movably coupled to said substrate via a hinge, said electrode and said actuator capable of generating an electrically induced force therebetween, wherein said actuator is capable of moving in response to a change in said electrically induced force; and a reflective element mounted to said actuator, a reflective surface of said reflective element displacing substantially in a single plane in response to movement of said actuator;

a first plurality of said MEMS optomechaincal switching cells coupled to said substrate, said first plurality of optomechanical switching cells in optical alignment with a corresponding plurality of first input ports and with a first output port; and a second plurality of said MEMS optomechanical switching cells coupled to said substrate, said second plurality of optomechanical switching cells in optical alignment with a corresponding plurality of second output ports.

3. An optomechanical matrix switch, comprising:

a substrate;

a MEMS optomechanical switching cell, comprising:
an electrode coupled to said substrate, said electrode capable of receiving an electrical signal;
an actuator, movably coupled to said substrate via a hinge, said electrode and said actuator capable of generating an electrically induced force therebetween, wherein said actuator is capable of moving in response to a change in said electrically induced force; and
a reflective element mounted to said actuator, a reflective surface of said reflective element displacing substantially in a single plane in response to movement of said actuator;

a first plurality of said MEMS optomechanical switching cells coupled to said substrate, each of said first plurality of optomechanical switching cells in optical alignment with a first input port;

a second plurality of said MEMS optomechanical switching cells coupled to said substrate, each of said second plurality of optomechaincal switching cells in optical alignment with a second input port;

a third plurality of said MEMS optomechanical switching cells coupled to said substrate, each of said third plurality of optomechanical switching cells in optical alignment with a third input port; and a fourth plurality of said MEMS optomechanical switching cells coupled to said substrate, each of said fourth plurality of optomechaincal switching cells in optical alignment with a fourth input port.

4. The optomechanical matrix switch of claim 3 wherein said first plurality of MEMS optomechanical switching cells are arranged adjacent said third plurality of MEMS optomechanical switching cells along a first border of said matrix switch, and wherein said second plurality of MEMS optomechanical switching cells are arranged adjacent said fourth plurality of MEMS optomechanical switching cells along a second border of said matrix switch opposite said first border.

5. An optomechanical matrix switch, comprising:

a substrate;

a MEMS optomechanical switching cell, comprising:
an electrode coupled to said substrate, said electrode capable of receiving an electrical signal;
an actuator, movably coupled to said substrate via a hinge, said electrode and said actuator capable of generating an electrically induced force therebetween, wherein said actuator is capable of moving in response to a change in said electrically induced force; and
a reflective element mounted to said actuator, a reflective surface of said reflective element displacing substantially in a single plane in response to movement of said actuator;

a first plurality of said MEMS optomechanical switching cells coupled to said substrate, said first plurality of optomechanical switching cells in optical alignment with a corresponding plurality of first input ports and with a first output port;

a second plurality of said MEMS optomechanical switching cells coupled to said substrate, said second plurality of optomechanical switching cells in optical alignment with a corresponding plurality of second output ports;

a third plurality of said MEMS optomechanical switching cells coupled to said substrate, said third plurality of optomechanical switching cells in optical alignment with a corresponding plurality of third input ports and with a third output ports; and a fourth plurality of said HEMS optomechanical switching cells coupled to said substrate, said fourth plurality of optomechanical switching cells in optical alignment with a corresponding plurality of fourth output ports.

6. An optomechanical matrix switch, comprising:

a substrate;

a MEMS optomechanical switching cell, comprising:
an electrode coupled to said substrate, said electrode capable of receiving an electrical signal;
an actuator, movably coupled to said substrate via a hinge, said electrode and said actuator capable of generating an electrically induced force therebetween, wherein said actuator is capable of moving in response to a change in said electrically induced force; and
a reflective element mounted to said actuator, a reflective surface of said reflective element displacing substantially in a single plane in response to movement of said actuator;

a first plurality of said MEMS optomechaincal switching cells coupled to said substrate, each of said first plurality of optomechanical switching cells in optical alignment with one of a corresponding first plurality of input ports and with one of a corresponding first plurality of output ports; and a second plurality of said MEMS optomechanical switching cells coupled to said substrate, each of said second plurality of optomechanical switching cells in optical alignment with one of a corresponding second plurality of input ports and with one of a corresponding second plurality of output ports.

7. The optomechanical matrix switch of claim 6 wherein each of said first plurality of input ports are arranged to be in optical alignment with a corresponding one of said second plurality of output ports.

8. An optomechanical matrix switch, comprising:

a substrate;

a MEMS optomechanical switching cell, comprising:
an electrode coupled to said substrate, said electrode capable of receiving an electrical signal;
an actuator, movably coupled to said substrate via a hinge, said electrode and said actuator capable of generating an electrically induced force therebetween, wherein said actuator is capable of moving in response to a change in said electrically induced force; and a reflective element mounted to said actuator, a reflective surface of said reflective element displacing substantially in a single plane in response to movement of said actuator;

a first plurality of said MEMS optomechaincal switching cells coupled to said substrate, each of said first plurality of optomechanical switching cells in optical alignment with one of a corresponding first plurality of input ports arranged along a first border of said matrix switch and with one of a corresponding first plurality of output ports arranged along a second border of said matrix switch; and a second plurality of said MEMS optomechanical switching cells coupled to said substrate, each of said second plurality of optomechanical switching cells in optical alignment with one of a corresponding second plurality of input ports arranged along a third border of said matrix switch and with one of a corresponding second plurality of output ports arranged along a fourth border of said matrix switch.

9. An optomechanical matrix switch, comprising:

a substrate;

a MEMS optomechanical switching cell, comprising:
   an electrode coupled to said substrate, said electrode capable of receiving an electrical signal;
   an actuator, movably coupled to said substrate via a hinge, said electrode and said actuator capable of generating an electrically induced force therebetween, wherein said actuator is capable of moving in response to a change in said electrically induced force; and
   a reflective element mounted to said actuator, a reflective surface of said reflective element displacing substantially in a single plane in response to movement of said actuator;

a first plurality of said MEMS optomechanical switching cells coupled to said substrate, each of said first plurality of optomechanical switching cells in optical alignment with one of a corresponding first plurality of input ports and with one of a corresponding first plurality of output ports;

a second plurality of said MEMS optomechanical switching cells coupled to said substrate, each of said second plurality of optomechanical switching cells in optical alignment with one of a corresponding second plurality of input ports and with one of a corresponding second plurality of output ports;

a third plurality of said MEMS optomechanical switching cells coupled to said substrate, each of said third plurality of optomechanical switching cells in optical alignment with one of a corresponding third plurality of input ports and with one of a corresponding third plurality of output ports; and a fourth plurality of said MEMS optomechanical switching cells coupled to said substrate, each of said fourth plurality of optomechanical switching cells in optical alignment with one of a corresponding fourth plurality of input ports and with one of a corresponding fourth plurality of output ports.

10. An optomechanical matrix switch, comprising:

a substrate;

a MEMS optomechanical switching cell, comprising:
   an electrode coupled to said substrate, said electrode capable of receiving an electrical signal;
   an actuator, movably coupled to said substrate via a hinge, said electrode and said actuator capable of generating an electrically induced force therebetween, wherein said actuator is capable of moving in response to a change in said electrically induced force; and
   a reflective element mounted to said actuator, a reflective surface of said reflective element displacing substantially in a single plane in response to movement of said actuator;

a plurality of said MEMS optomechanical switching cells coupled to said substrate, each of said plurality of optomechanical switching cells in optical alignment with
   one of a corresponding plurality of input ports,
   one of a corresponding plurality of first output ports, and
   one of a corresponding plurality of second output ports.

11. The optomechanical matrix switch of claim 10 wherein said plurality of input ports are arranged along a first border of said matrix switch, said plurality of first output ports are arranged along a second border of said matrix switch, and said plurality of second output ports are arranged along a third border of said matrix switch.

12. The optomechanical matrix switch of claim 11 wherein said electrically induced force is a magnetic force.

13. The optomechanical matrix switch of claim 10 wherein said electrically induced force is an electrostatic force.

14. An optomechanical matrix switch, comprising:

a substrate;

a MEMS optomechanical switching cell, comprising:
   an electrode coupled to said substrate, said electrode capable of receiving an electrical signal;
   an actuator, movably coupled to said substrate via a hinge, said electrode and said actuator capable of generating an electrically induced force therebetween, wherein said actuator is capable of moving in response to a change in said electrically induced force; and
   a reflective element mounted to said actuator, a reflective surface of said reflective element displacing substantially in a single plane in response to movement of said actuator;

a first plurality of said MEMS optomechanical switching cells;

a second plurality of said MEMS optomechanical switching cells;

an add port in optical alignment with said first plurality of MEMS optomechanical switching cells;

a drop port in optical alignment with said second plurality of MEMS optomechanical switching cells;

a plurality of output ports, wherein each one of said plurality of output ports is in optical alignment with a respective one MEMS optomechanical switching cell of said first plurality of MEMS optomechanical switching cells; and a plurality of input ports, wherein each one of said plurality of input ports is in optical alignment with a respective one MEMS optomechanical switching cell of said second plurality of MEMS optomechanical switching cells, and wherein each one of said plurality of input ports is in optical alignment with a respective one of said plurality of output ports.

15. The optomechanical matrix switch of claim 14, wherein said actuator is pivotally coupled to said substrate.

16. The optomechanical matrix switch of claim 14, wherein said electrically induced force is an electrostatic force.

17. The optomechanical matrix switch of claim 14, wherein said electrically induced force is a magnetic force.

18. An optomechanical matrix switch, comprising:

a substrate;

a MEMS optomechanical switching cell, comprising:
- an electrode coupled to said substrate, said electrode capable of receiving an electrical signal;
- an actuator, pivotably coupled to said substrate via a hinge, said electrode and said actuator capable of generating an electrostatic force therebetween, wherein said actuator is capable of moving in response to a change in said electrostatic force; and
- a reflective element mounted to said actuator, a reflective surface of said reflective element displacing substantially in a single plane in response to movement of said actuator;

a first plurality of said MEMS optomechanical switching cells;

a second plurality of said MEMS optomechanical switching cells;

an add port in optical alignment with said first plurality of MEMS optomechanical switching cells;

a drop port in optical alignment with said second plurality of MEMS optomechanical switching cells;

a plurality of output ports, wherein each one of said plurality of output ports is in optical alignment with a respective one MEMS optomechanical switching cell of said first plurality of MEMS optomechanical switching cells; and a plurality of input ports, wherein each one of said plurality of input ports is in optical alignment with a respective one MEMS optomechanical switching cell of said second plurality of MEMS optomechanical switching cells, and wherein each one of said plurality of input ports is in optical alignment with a respective one of said plurality of output ports.

\* \* \* \* \*